United States Patent [19]

Lawrie

[11] Patent Number: 5,979,257
[45] Date of Patent: Nov. 9, 1999

[54] AUTOMATED MANUAL TRANSMISSION MODE SELECTION CONTROLLER

[75] Inventor: Robert E. Lawrie, Whitmore Lake, Mich.

[73] Assignee: Chrysler Corporation, Auburn Hills, Mich.

[21] Appl. No.: 08/982,099

[22] Filed: Dec. 1, 1997

[51] Int. Cl.⁶ .................................................. F16H 61/32
[52] U.S. Cl. ............................... 74/335; 74/339; 701/51; 180/65.2
[58] Field of Search ..................................... 477/2, 3, 5, 6; 74/335, 336 R, 339; 701/56, 51; 180/65.2

[56] References Cited

U.S. PATENT DOCUMENTS

| | | |
|---|---|---|
| 2,960,200 | 11/1960 | Strauss . |
| 3,001,618 | 9/1961 | McCordic et al. . |
| 3,478,851 | 11/1969 | Smyth et al. ............................ 74/339 X |
| 4,006,801 | 2/1977 | Bayliss . |
| 4,033,435 | 7/1977 | Bayliss . |
| 4,208,925 | 6/1980 | Miller et al. ........................... 74/335 X |
| 4,361,060 | 11/1982 | Smyth ........................................ 477/78 |
| 4,400,997 | 8/1983 | Fiala . |
| 4,405,029 | 9/1983 | Hunt . |
| 4,410,071 | 10/1983 | Osterman . |
| 4,533,011 | 8/1985 | Heidemeyer et al. . |
| 4,601,369 | 7/1986 | Hattori et al. .................... 74/473.12 X |
| 4,627,312 | 12/1986 | Fujieda et al. ......................... 74/336 R |
| 4,644,811 | 2/1987 | Tervo . |
| 4,651,852 | 3/1987 | Wickham et al. . |
| 4,793,206 | 12/1988 | Suzuki . |
| 5,050,079 | 9/1991 | Steeby .................................. 74/335 X |
| 5,267,635 | 12/1993 | Peterson et al. . |
| 5,321,993 | 6/1994 | Herzog et al. . |
| 5,337,848 | 8/1994 | Bader ....................................... 477/4 X |
| 5,526,909 | 6/1996 | Ohkawa . |
| 5,560,249 | 10/1996 | Nellums ..................................... 74/339 |
| 5,562,565 | 10/1996 | Moroto et al. . |
| 5,578,911 | 11/1996 | Carter et al. . |
| 5,605,211 | 2/1997 | Hall, III . |
| 5,669,842 | 9/1997 | Schmidt . |
| 5,713,425 | 2/1998 | Buschhaus et al. . |
| 5,713,814 | 2/1998 | Hara et al. ........................ 180/65.2 X |
| 5,730,676 | 3/1998 | Schmidt . |
| 5,743,143 | 4/1998 | Carpenter et al. . |
| 5,755,302 | 5/1998 | Lutz et al. . |

FOREIGN PATENT DOCUMENTS

| | | |
|---|---|---|
| 2237350 | 5/1991 | United Kingdom . |
| WO 95/02857 | 1/1995 | WIPO . |

*Primary Examiner*—Charles A Marmor
*Assistant Examiner*—Ankur Parekh
*Attorney, Agent, or Firm*—Jennifer M. Stec

[57] ABSTRACT

A powertrain system for a hybrid vehicle. The hybrid vehicle includes a heat engine, such as a diesel engine, and an electric machine, which operates as both an electric motor and an alternator, to power the vehicle. The hybrid vehicle also includes a manual-style transmission configured to operate as an automatic transmission from the perspective of the driver. The engine and the electric machine drive an input shaft which in turn drives an output shaft of the transmission. In addition to driving the transmission, the electric machine regulates the speed of the input shaft in order to synchronize the input shaft during either an upshift or downshift of the transmission by either decreasing or increasing the speed of the input shaft. When decreasing the speed of the input shaft, the electric motor functions as an alternator to produce electrical energy which may be stored by a storage device. Operation of the transmission is controlled by a transmission controller which receives input signals and generates output signals to control shift and clutch motors to effect smooth launch, upshift shifts, and downshifts of the transmission, so that the transmission functions substantially as an automatic transmission from the perspective of the driver, while internally substantially functioning as a manual transmission.

15 Claims, 16 Drawing Sheets

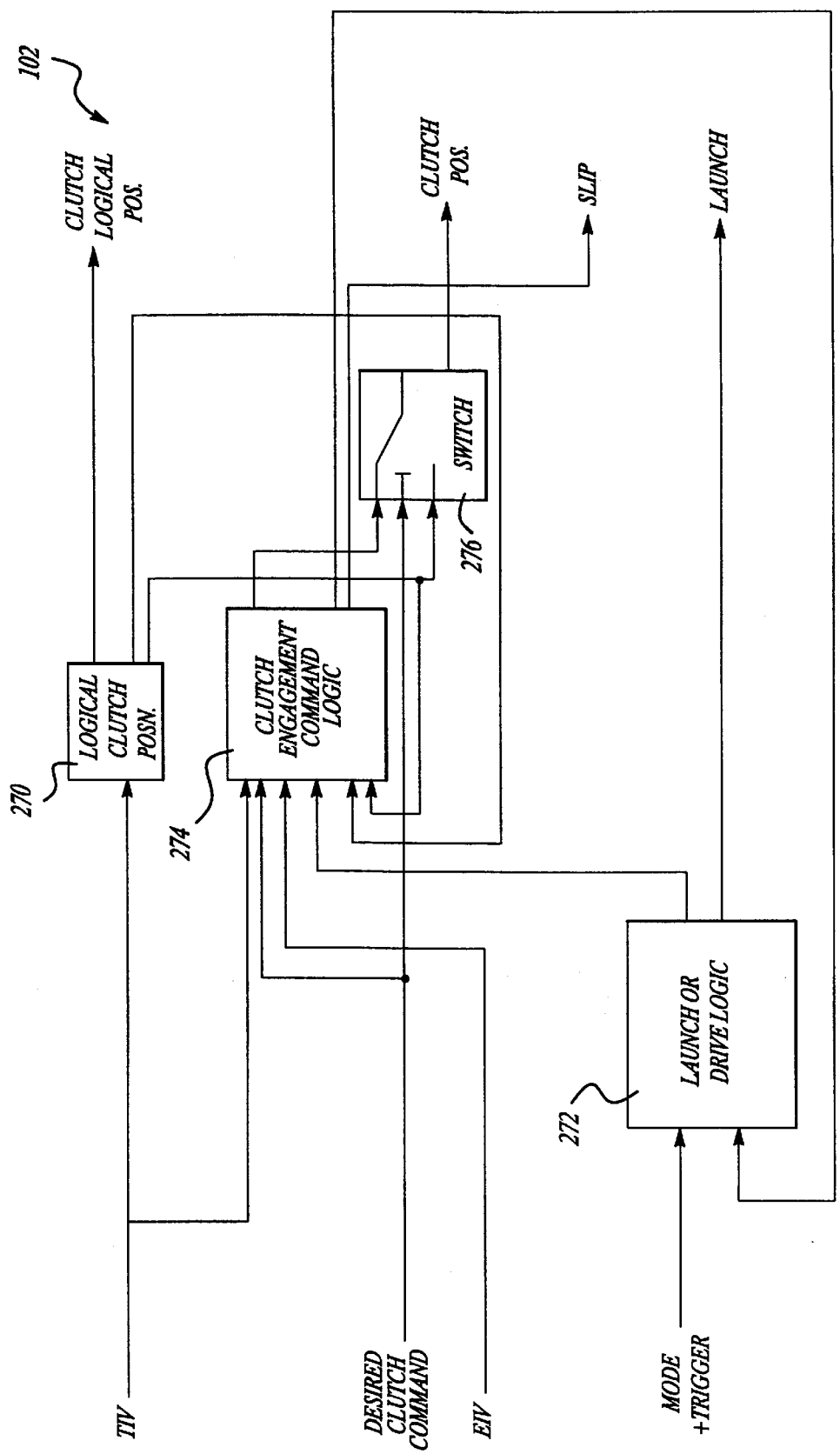

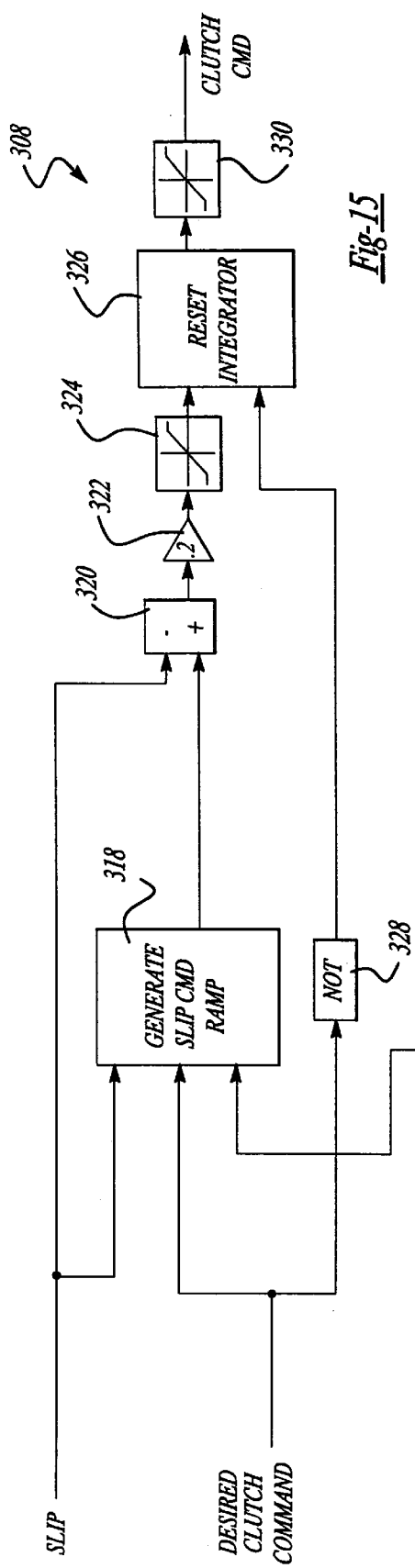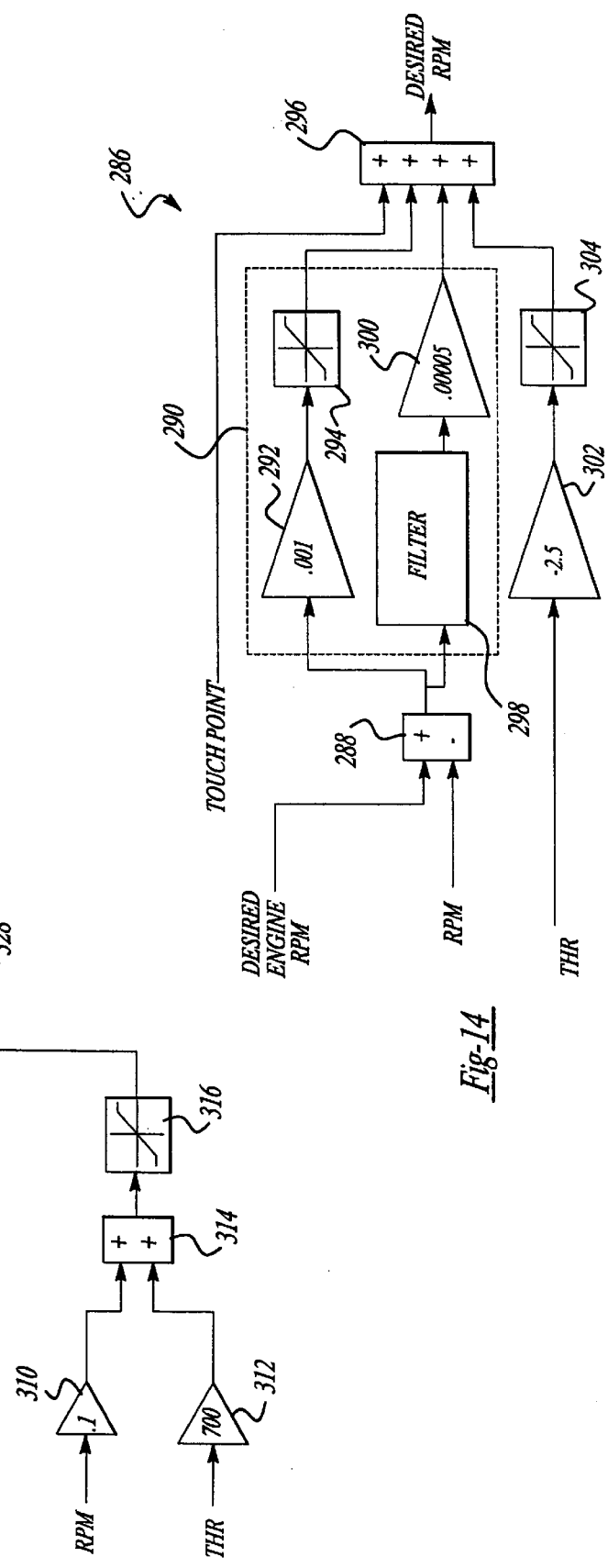

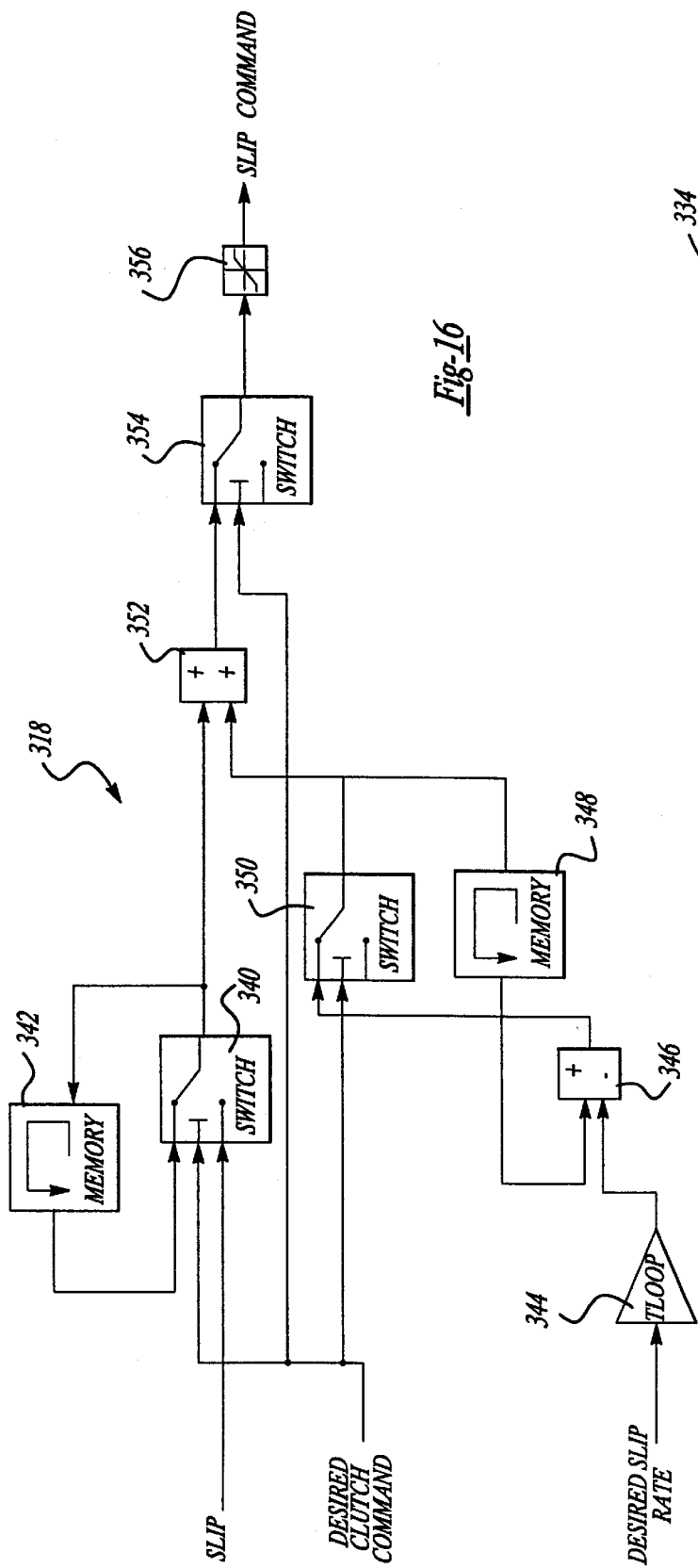
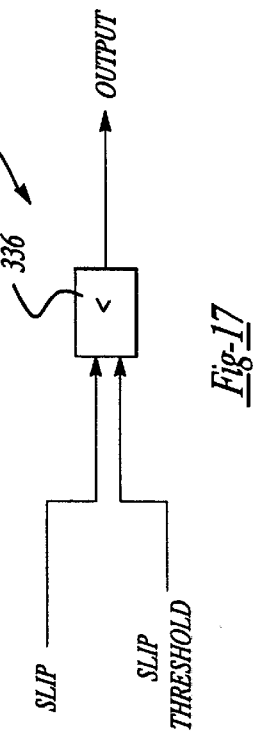

AUTOMATED MANUAL TRANSMISSION MODE SELECTION CONTROLLER

The government of the United States of America has rights in this invention pursuant to Subcontract No. ZAN-6-16334-01 awarded by the U.S. Department of Energy.

BACKGROUND OF THE INVENTION

1. Field of the Invention

The present invention relates generally to a hybrid powertrain system for motor vehicles and, more particularly, to an electronically controlled transmission for hybrid powertrain system for a motor vehicle.

2. Description of the Related Art

Since the invention of power vehicles, many different powertrain systems have been attempted, including a steam engine with a boiler or an electric motor with a storage battery. It was, however, the discovery of petroleum in 1856 and the four-stroke internal combustion engine invented by Otto in 1876, that provided the impetus for the modern motor vehicle industry. Although fossil fuel emerged as the fuel of choice for motor vehicles, recent concerns regarding fuel availability and increasingly stringent federal and state emission regulations have renewed interest in alternative fuel powered vehicles. Alternative fuel vehicles include vehicles powered by methanol, ethanol, natural gas, electricity, or a combination of these fuels.

Of these vehicles, electrically powered alternative fuel vehicles offers several advantages: electricity is readily available, an electric power distribution system is already in place, and an electric powered vehicle produces virtually no emissions. There are, however, several technological disadvantages that must be overcome before electric powered vehicles gain acceptance in the marketplace. For instance, the range of an electric powered vehicle is limited to approximately 100 miles, compared to approximately 300 miles for a similar fossil fuel powered vehicle. Further, the acceleration is significantly less than that of a comparable fossil fuel powered vehicle.

A hybrid powered vehicle, powered by both a fuel source and an energy storage device, overcomes the technical disadvantages of a dedicated electric vehicle while still offering an environmental benefit. The performance and range characteristics of the hybrid powered vehicle is comparable to a conventional fossil fuel powered vehicle. Thus, there is a need in the art for hybrid powertrain system for a motor vehicle that is energy efficient, has low emissions, and offers the performance of a conventional fossil fuel powered vehicle. Further, there is a need for a transmission system to complement the combined electric and gas power plants.

There are presently two transmissions available for use on conventional automobiles. The first, and oldest, type of transmission is the manually operated transmission. These transmissions are characterized in that vehicles having manually operated transmissions include a clutch pedal usually positioned to the left of the brake pedal and a H configuration gear shift lever which is usually mounted in the center of the vehicle just behind the dashboard. To operate the manual transmission, the driver must coordinate depression of the clutch and accelerator pedals with the position of the shift lever in order to shift into the desired gear. Proper operation of a manual transmission is well known to those of skilled in the art, and will not be described further herein.

In a vehicle having an automatic transmission, no clutch pedal is necessary, and the standard H configuration shift lever is replaced by a shift lever which moves back and forth for gear selection. The driver need only select between park, reverse, neutral, drive, and 1 or 2 low gears then operate an accelerator and a brake pedal. As it is commonly known in the art, the shift lever is placed in one of several positions having the designation P, R, N, D, 2, and possibly 1, which corresponds to park, reverse, neutral, drive, and first or second low gears, respectively. Vehicle operation when the gear shift lever is placed in one of these positions is well know in the art. In particular, when in drive mode, the transmission automatically selects between the available forward gears. As is also well known, older transmission systems typically included first, second, and third gears, while newer transmission systems include first through third gears as well as a fourth and possibly a fifth overdrive gears. The overdrive gears provide improved fuel economy at higher speeds.

Early transmissions were almost exclusively manually operated transmissions. With a steady development of automatic transmissions, drivers increasingly gravitated toward the ease of operation offered by automatic transmissions. However, in the middle 1970's, heightened concerns about present and future fossil fuel shortages resulted in implementation of corporate average fuel economy regulations. These fuel economy requirements necessitated investigating increasing the fuel economy of motor vehicles in order to meet government regulations. These government regulations prompted further investigation of and a renewed interest in transmission efficiency.

In the ensuing years, many mechanical vehicle systems were adapted to include electronic actuator mechanisms to replace the mechanical actuators or, alternatively, were adapted to be electronically controlled. The electronic control systems greatly increased the fuel efficiency of vehicle engines and enabled a gradual reversion to the convenience of automatic transmissions. In addition, electronic controls placed on automatic transmissions greatly improved the shift schedules and shift feel of automatic transmissions and also enabled acceptable implementation of fourth and fifth overdrive gears, thereby increasing fuel economy. Thus, automatic transmissions have become increasingly popular.

Automatic and manual transmissions offer various competing advantages and disadvantages. A manual transmission enables the driver to select particular forward gears, depending upon the driving conditions. For example, the driver may shift from fifth to third when needing additional power in order to quickly accelerate the vehicle, such as in a passing situation. Manual transmissions also provide the driver with greater control of vehicle acceleration, because the driver may maintain the transmission in a lower forward gear for continued acceleration. On the other hand, an automatic transmission may upshift when the driver does not desire such an upshift, thereby limiting vehicle acceleration. Further, skilled drivers can take advantage of weight distribution between the front and rear tires by selectively upshifting and downshifting when entering and exiting curves and corners. Finally, some drivers prefer the sporty impression that manual transmissions provide. Conversely, automatic transmissions first and foremost offer ease of operation, so that the driver need not burden both hands, one for the steering wheel and one for the gear shifter, and both feet, one for the clutch and one for the gas and brake while driving. When operating an automatic transmission the driver has one hand and one foot free. In addition, an automatic transmission provides extreme convenience in stop and go situations, as the driver need not worry about continuously shifting gears to adjust the ever-changing speed of traffic.

With respect to hybrid vehicles, however, manual transmissions prove to be particularly advantageous to increasing efficiency, thereby improving fuel economy. The primary reason for the superior efficiency of the manual transmission in the hybrid vehicle lies in the basic operation of automatic transmissions. In most automatic transmissions, the output of the engine connects to the input of the transmission through a torque converter. Most torque converters have an input turbine connected to the output shaft of the engine and an input turbine connected to the input shaft of the transmission. Movement of the turbine at the input side results in a hydraulic fluid flow which causes a corresponding movement of the turbine connected to the input shaft of the transmission. While torque converters provide a smooth coupling between the engine and the transmission, hydraulic fluid inherently introduces parasitic losses, thereby decreasing efficiency of the powertrain. Further, the shift operation in an automatic transmission also requires hydraulic fluid pressure, thereby introducing additional parasitic losses and efficiency in the powertrain. Thus, there is a need in the art for a powertrain system having an efficient transmission which limits parasitic losses due to hydraulic fluid control.

Thus, it is an object of the present invention to provide a hybrid powertrain system for a motor vehicle.

It is another object of the present invention to provide a hybrid powertrain system having an improved power distribution system.

It is yet another object of the present invention to provide a transmission for a hybrid powertrain system which eliminates parasitic losses due to hydraulic fluid flow which occurs in a typical automatic transmission.

It is yet another object of the present invention to provide an automatic transmission for a hybrid powertrain system which configured substantially as a manually operated transmission.

It is yet another object of the present invention to provide a transmission for a hybrid powertrain system which is configured as a manual-style transmission and is electronically controlled to substantially operate as an automatic transmission, thereby eliminating parasitic loses due to hydraulic fluid flow.

It is yet another object of the present invention to provide a hybrid powertrain transmission system that utilizes an electric machine to synchronize the speed of the driving or input shaft of the transmission with the speed of the driven or output shaft of the transmission.

It is yet another object of the present invention to provide a hybrid powertrain transmission system that utilizes an electric machine to reduce the speed of the driving or input shaft of the transmission in order to synchronize the input shaft speed with the driving or output shaft speed and which operates in a regenerative mode to output electricity when reducing the speed of the input shaft.

It is yet a further object of the present invention to provide a hybrid powertrain transmission system that utilizes an electric machine to synchronize the speed of the driving or input shaft with the speed of the driven or output shaft of the transmission by increasing the speed of the input shaft in order to synchronize the speeds of the input and output shafts.

It is yet a further object of the present invention to provide a hybrid powertrain transmission system having a set of electric motors to effect depressing a clutch of a manual-style transmission and to effect shifting gears of a manual-style transmission.

It is yet another object of the present invention to provide a hybrid powertrain transmission system having electric motors to effect operation of the clutch and shifting a of the gears of a manual-style transmission in accordance with electronic control signals generated by a transmission controller.

SUMMARY

To achieve the foregoing objects, the present invention is a hybrid powertrain system for a motor vehicle including a transmission operably connected to an engine of the motor vehicle, and an electric machine operably connected to the transmission, wherein the electric machine produces either one of positive and regenerative torque.

The engine produces an output torque transmitted to the transmission through a driving or input shaft. The input shaft includes one or more gear sets which mesh with corresponding gear sets on a driven or output shaft so that rotation of the driving or input shaft causes a corresponding rotation of the driven or output shaft. The rotational speed of the output shaft depends upon which particular gear sets of the input and output shafts are engaged. The output shaft correspondingly causes rotational movement of a differential which in turn causes movement of a pair of drive wheels. The input shaft also is connected to the electric machine through a gear set.

The electric machine interacts with the transmission in one of several ways. In a first condition, the electric machine operates as a motor and assists the engine with imparting motion to the input shaft. In this manner, the electric machine assists the engine in driving the drive wheels. In a second condition, the electric machine assists in synchronizing the relative speeds of the input and output shafts during an upshift in order to effect smooth engagement of the selected gears. During an upshift, the electric machine operates as an alternator and decreases the speed of input shaft to substantially match that of the output shaft. Further, during this condition, the electric machine outputs electrical energy which is stored in an energy storage source. In a third condition, the electric machine synchronizes the relative speeds of the input and output shafts during a downshift. During a downshift, the electric machine applies an accelerating force to increase the speed of the input shaft to substantially match that of the output shaft and enable smooth engagement of the gears. In a fourth condition, the electric machine is essentially off and moves in accordance with the input shaft.

The transmission of the present invention is a manual-style transmission having electronic motors and controls configured to operate the transmission substantially as an automatic transmission. The gear shift mechanism of a conventional manual-style transmission is replaced by a pair of shift motors. One shift motor, the select motor, performs the function of the mechanical linkage which occurs when moving a conventional manual transmission shifter backward and forward in a standard H configuration. A second motor, the crossover motor, replaces the operation performed by a mechanical linkage when moving the stick shift side to side in a standard H configuration. In addition to the select and crossover motor, a clutch motor replaces the function performed by a mechanical linkage when operating the clutch of a conventional manual transmission. The select, crossover, and clutch motors are operated by a transmission controller which generates control signals to actuate the motors in accordance with the desired shift. In addition, the electric machine is connected to the transmission and operates in one of the four conditions described above.

The transmission controller generates control signals to the select motor, crossover motor, clutch motor, to effect gear shifts of the manual-style transmission. The transmission controller also generates control signals to the engine or engine controller and the electric machine to vary the output torque of the engine and electric machine, respectively. The transmission controller also receives input signals from the respective select motor, crossover motor, and the electric machine. The transmission machine also receives input signals from a gear shifter which can be positioned to operate in an automatic mode or can be positioned to enable the driver to select between the forward gears of the transmission similar to a manual transmission. The transmission controller also receives input signals from the transmission to facilitate synchronizing the gears during a shift of gears.

One advantage of the present invention is that the automatically controlled manual-style transmission provides a more efficient transmission system by eliminating parasitic loses due to hydraulic fluid flow in automatic transmissions.

Another advantage of the present system is that the electronic controller automatically controls the manual-style transmission so that the transmission appears as an automatic transmission to the driver.

Yet another advantage to the present invention is that during a shift, the electric motor substantially synchronies the speed of the input shaft with the speed of the output shaft of the transmission, traversly eliminating the need for mechanical synchronizers.

Yet another advantage of the present invention is that the new hybrid powertrain system takes advantage of regenerative braking to capture kinetic energy usually lost while braking and storing it as potential energy.

Yet another advantage of the present invention is that the hybrid powertrain system includes an electric machine which transfers the kinetic energy into potential energy, which is stored in an energy storage apparatus.

Additional objects, features and advantages of the present invention will become apparent from the following description and the appended claims, taken in connection with the accompanying drawings.

BRIEF DESCRIPTION OF THE DRAWINGS

FIG. 12 is an expanded block diagram of the clutch command logic of the logic controller of FIG. 4;

FIG. 14 is an expanded block diagram of the regulate RPM block of clutch engagement command logic of FIG. 13;

FIG. 15 is an expanded block diagram of regulate slip block of the clutch engagement command logic of FIG. 13;

FIG. 16 is an expanded block diagram of the generate slip command ramp block of FIG. 15; and FIG. 17 is an expanded block diagram of the determine when to close clutch fully block of the clutch engagement command logic of FIG. 13.

DETAILED DESCRIPTION OF THE INVENTION

Figure 1:
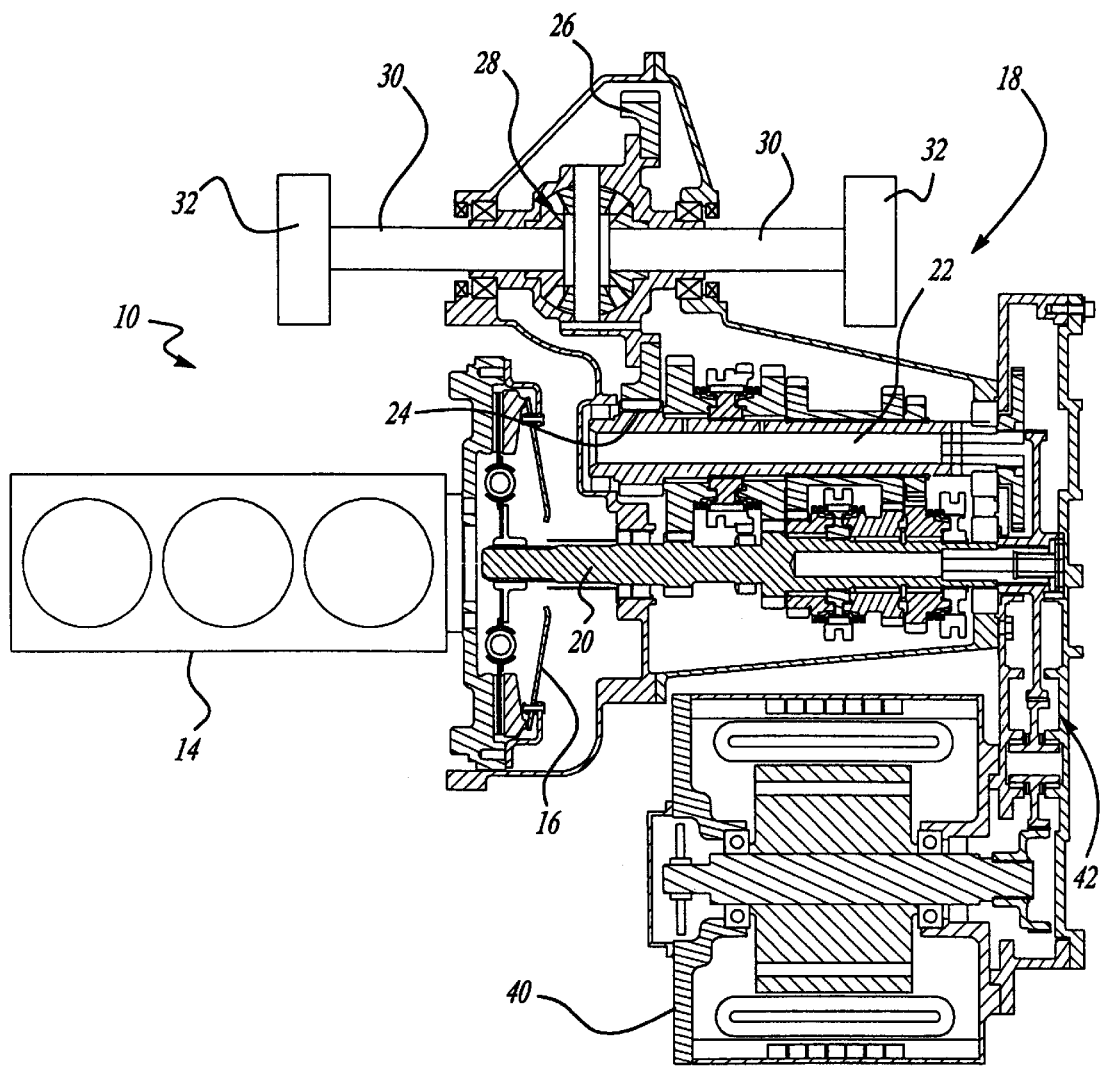
FIG. 1 is a partial crosssectional view of a hybrid powertrain system for a motor vehicle arranged in accordance with the present invention.
Figure 2:
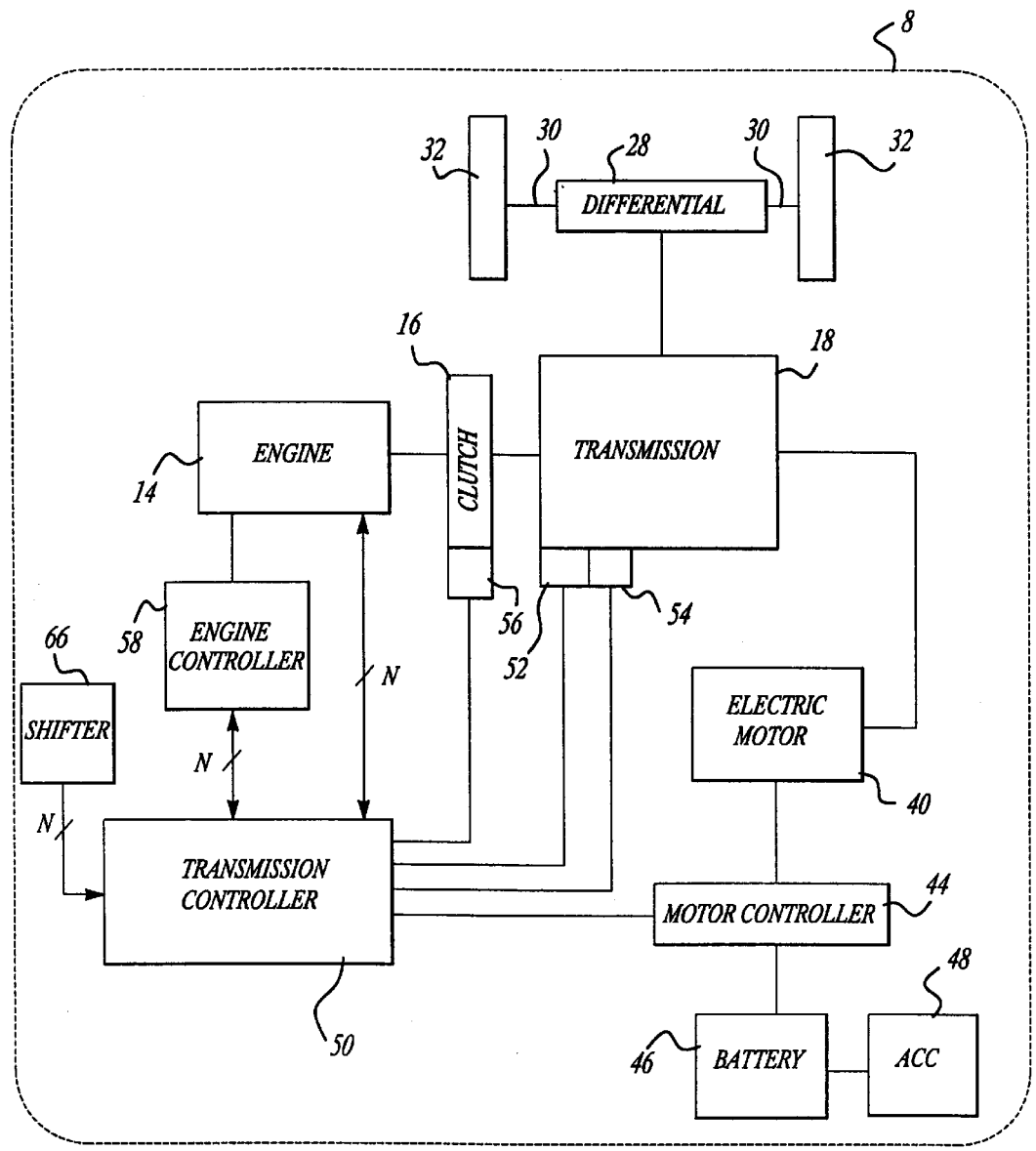
FIG. 2 is a block diagram showing the electrical components for enabling automatic control of the manual-style transmission of the hybrid powertrain system of FIG. 1.

Referring to FIGS. 1 and 2, a hybrid powertrain system 10, arranged according to the present invention is illustrated for a motor vehicle, generally at 8 of FIG. 2. The hybrid powertrain system 10 includes a heat engine 14 operating on a hydrocarbon based or fossil fuel. In this example, the engine 14 is a compression-ignited engine fueled by a diesel fuel. Preferably, the engine 14 is sized comparably to a diesel engine for non-hybrid motor vehicle. The hybrid powertrain system 10 includes a clutch mechanism 16, as is known in the art, for operably interconnecting engine 14 and transmission 18. The clutch mechanism 16 compensates for the difference in rotational speed of engine 14 and transmission 18, to smooth engagement between engine 14 and transmission 18.

Transmission 18 connects to engine 14 through clutch 16 and transmits engine 14 rotation and power at various ratios to drive wheels 32 of motor vehicle 8. Thus, transmission 18 enables motor vehicle 8 to accelerate through predetermined gear ratios, while engine 14 functions within a predetermined operating range to drive transmission 18. Examples of known transmission 18 types include an automatic transmission, a manual transmission, or a continuously variable transmission. It should be appreciated that in a preferred embodiment transmission 18 is generally a conventional five-speed manual transmission as is well known in the art having modifications as described herein.

Transmission 18 includes a driving or input shaft 20 operatively connected to clutch 16. Input shaft 20 supports a plurality of gears which selectively mesh for engagement with a plurality of gears supported on a counter or output shaft 22, also referred to as a driven shaft. Input shaft 20 is also referred to as the driving shaft and a output shaft 22 is also referred to as the driven shaft because within transmission 18, input shaft 20 drives output shaft 22. Output shaft 22 includes an output gear 24 which meshingly engages with ring gear 26 of differential 28. Differential 28 engages a pair of drive shafts 30, which are operably connected to a pair of drive wheels 32, and provides power to drive wheels 32. The operation of a differential is well known to those skilled in the art and will not be described herein. The operation of engine 14 produces a torque output which causes input shaft 20 to rotate at a first rate. Concurrently, output shaft 22 rotates at a second rate related to the rate of rotation of input shaft 20 in accordance with the particular gear set engaged between the respective shafts. Similarly, output shaft 22 drives the differential 28 to cause rotation of drives shafts 30 and drive wheels 32.

Before a shift between gears of transmission 18 can occur, it is necessary to synchronize the rotational speed of the input shaft 20 to the speed that the input shaft will be at when the next gear is engaged. A synchronizing mechanism such as a mechanical synchronizer (not shown) enables such synchronization as is well known in the art. The mechanical synchronizer reduces the relative speed between input shaft 20 and output shaft 22 to enable smooth engagement of the gear set. For example, during an upshift, the mechanical synchronizer utilizes frictional forces to decrease the rate of rotation of input shaft 20 so that the speed of the input shaft 20 will allow the next gear to be engaged smoothly. Conversely, during a downshift, the mechanical synchronizer utilizes frictional forces to increase the rate of rotation of the input shaft 20 so that the speed of the input shaft 20 will allow the next gear to be engaged smoothly.

Hybrid powertrain system 10 also includes an electric machine or motor 40 operably connected to transmission 18 at the opposite end of input shaft 20 from clutch 16. Electric motor 40 connects to input shaft 20 opposite from clutch 16 through a gear pack or set 42. Electric motor 40 is able to provide both positive and regenerative torque, by functioning as a motor or an alternator, respectively. An example of an electric motor 40 is an induction motor or a permanent magnet motor, such as DRX 67534 manufactured by Delphi Energy & Engine Management Systems.

As an alternator, electric motor 40 produces a regenerative torque, preferably as an alternating current (AC), which is transferred to a control mechanism, such as motor controller 44. Motor controller 44 converts the alternating current into a direct current (DC), as is well known in the art. The direct current may then be transmitted to an energy storage apparatus, such as a battery. Alternatively, as a motor, electric motor 40 produces a positive torque that is applied to input shaft 20 of transmission 18 and ultimately to drive wheels 32.

In this example, electric motor 40 is positioned to rotate input shaft 20, although other configurations are possible. By configuring electric motor 40 to rotate input shaft 20, electric motor 40 eliminates the need for the mechanical synchronizers as previously described. For example, transmission controller 50 is able to sense the rotational speed of input shaft 20 through a sensor. Further, the speed of output shaft 22 is known, such as from a vehicle speed sensing mechanism or rotational sensor. Thus, it can be determined which gear of transmission 18 is engaged. Based on this information, during a shift event, electric motor 40 is able to synchronize the speed of input shaft 20 of transmission 18 with output shaft 22, thereby eliminating the need for a mechanical synchronizer.

Another capability of electric motor 40 is to start the engine 14. Electric motor 40, when functioning as a motor, initiates the torque and rotational speed necessary to turn input shaft 20. With clutch mechanism 16 engaged, engine 14 is cranked to start the engine. Thus, a conventional starter motor is unnecessary.

Hybrid powertrain system 10 may also include a conventional braking system (not shown) operably connected to the wheels, as is known in the art. An example of a braking system is a driver assisted hydraulic braking system. In operation, the driver depresses a brake pedal (not shown) to mechanically apply a braking force to slow down the spinning of drive wheels 32 or maintain drive wheels 32 in a stationary position. However, with a hydraulic braking system, the momentum of the motor vehicle, in the form of kinetic energy, is usually lost.

According to the present invention, a preferred type of braking system involves a regenerative braking system. The regenerative braking system captures kinetic energy from the momentum of vehicle 8 as it slows down and stores this energy as potential energy in the energy storage apparatus or battery 46. Electric motor 40 slows the motor vehicle down by applying a braking force that slows down the rotation of drive shafts 30 through input shaft 20, output shaft 22, and differential 28. Accordingly, electric motor 40 functions as an alternator and captures the reverse energy flow.

Hybrid powertrain system 10 also includes a transmission controller 50, such as an electronic control unit. Transmission controller 50 enables electronic control of transmission 18 to enable to transmission 18 to be configured as a manual-style transmission, but to be operated from a driver's perspective as an automatic transmission. To effect such operation, transmission 18 has a trio of motors 52, 54, and 56 which operate the clutch and control the shifting of gears in the manual-style transmission. Motors 52 and 54 cause movement within transmission 18 similar to movements caused by manipulating a stick shift in a conventional, manual transmission. Motor 52 causes movement of the gears within transmission 18 similar to movement caused by moving a stick shift side to side in a standard H configuration. Motor 54 causes movement of the gears within transmission 18 similar to movement caused by moving a stick shift forward and backward in a standard H configuration. Motor 56 replaces mechanical operation of clutch 16 as in a conventional manual transmission.

In order to generate such control signals, transmission controller 50 receives input signals from engine 14 or engine controller 58. Examples of such information received from engine 14 or engine controller 58 include vehicle speed, RPM, and the like. Transmission controller 50 also receives input signals from transmission 18, including input shaft speed and positional information for motors 52, 54, and 56. Transmission controller 50 generates output signals to control motors 52, 54, and 56 and also outputs diagnostic and other communication signals to engine 14 and/or engine controller 58. Transmission controller 50 may also receive other vehicle condition signals, depending on the particular configuration of hybrid powertrain system 10.

Transmission controller 50 also receives input from shifter 66. Shifter 66 is configured similar to a typical automatic transmission gear shift lever. Shifter 66 enables selection of park, reverse, neutral, drive, low gears (optional), and overdrive. Each gear position for the gear shift may have a indicator setting, such as P, R, N, D, O, and L (optional) respectively. Further, shifter 66 may have an additional detent setting to enable the driver to select forward gears in a manual-like mode. The shift lever of shifter 66 may be moved in a first direction to select park, reverse, neutral, drive, overdrive, and the manual mode. When in the manual setting, the shifter may be moved across the detent position so that a leftward movement corresponds to a downshift and a rightward movement corresponds to an upshift. In this manner, the driver is offered a simulated manual mode of operation.

With reference to motors 52, 54, and 56, these motors are preferably rotary motors which cause linear movement to effect engagement and disengagement of clutch 16, through clutch motor 56, or cause shifting of gears through motors 52 and 54. Motors 52 and 54, combine to replace mechanical linkages associated with a shift lever in a conventional manual transmission. That is, assuming a standard H configuration, motor 52 may operate as the crossover or xovr motor that selects a gear pack for shifting, as occurs when moving a shifter side to side between legs of the H. Similarly, motor 54 operates as a select motor which engages gears of the selected gear pack as occurs with back and forth movement of a shifter within a leg of the H. The motors 52, 54, and 56 receive control signals from transmission controller 50 to effect shifting gears of transmission 18. Transmission controller 50 also generates control signals to electric machine 40, also referred to as electric motor 40, through motor controller 44, to effect activation and deactivation of electric motor 40. Activation and deactivation of electric motor 40 enables varying the speed of input shaft 20 through gear pack 42 so that synchronization of input shaft 20 and output shaft 22 can be achieved to engage the desired gears.

Hybrid powertrain system 10 also includes an energy storage apparatus 46, such as a battery, to store potential energy for later use by the motor vehicle. For example, the potential energy stored in battery 46 may be transferred, as DC current, to operate an accessory 48. In a typical motor vehicle, engine 14 operably supplies a battery with potential energy using a 12 volt alternator. In this invention, electric motor 40 supplies battery 46 with potential energy for storage.

Hybrid powertrain system 10 also includes at least one accessory component 48. An example of an accessory component may be a power steering pump, a water pump, a lighting system, a heating and cooling system, which are all conventional and well known in the art. Accessory component 48 is usually mechanically driven by engine 14 or electrically powered with energy from battery 46. For example, accessory component 48, such as a power steering pump, is operably connected to engine 14 and mechanically driven by engine 14, or a lighting system relies on energy supplied by the energy storage apparatus 46 as a source of power. According to the present invention, all of the accessory components 48 may be electrically powered using energy from the energy storage apparatus 46, in a manner to be described.

The present invention utilizes kinetic energy available during braking of the motor vehicle 8 and stores it as potential energy in battery 46. In a first direction of power flow, if a braking force is applied to drive wheels 32, the available kinetic energy is directed through drive shafts 30 and transmission 18, as the rotational speed of the drive shafts 30, output shaft 22, and input shaft 20 decreases. The kinetic energy flows into electric motor 40, causing it to function as an alternator, to produce a negative torque, preferably as an AC current. The AC current is transmitted to a motor controller 44 which converts it to a DC current. The DC current is transferred to the energy storage apparatus 46 for storage as potential energy. If the accessory component 48 requires energy, it is drawn from battery 46, in the form of DC current. This enhances the efficiency of the vehicle 8, since engine 14 does not expend power to operate accessory 48.

In an opposite situation, energy storage apparatus 46 supplies potential energy, such as a DC current, to motor controller 44, which converts it into an AC current. The AC current is directed to electric motor 40, causing it to act as a motor and produce a positive torque. The positive torque is applied to transmission 18, which in turn induces the rotation of the drive shafts 30 and the rotation of the drive wheels 32 of the motor vehicle 8.

Figure 3:
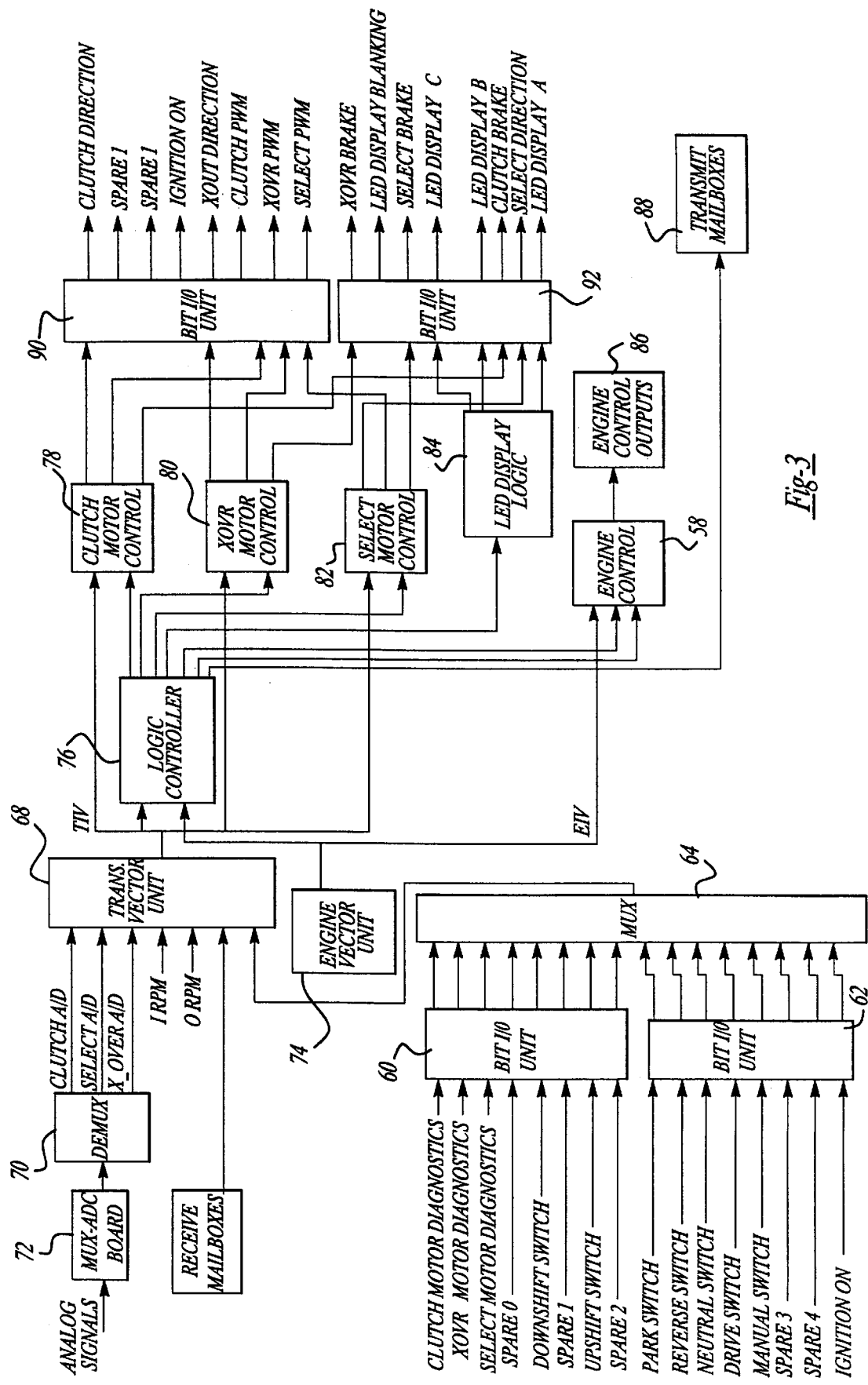
FIG. 3 is a block diagram of the transmission controller of FIG. 2 for receiving and generating electronic signals to effect control of the automatic manual transmission.

FIG. 3 depicts an expanded block diagram of transmission controller 50 of FIG. 2. There are several digital and analog inputs to transmission controller 50. With respect to digital inputs, bit I/O units 60 and 62 receive various digital inputs which are then output to multiplexer 64. Bit I/O units 60 and 62 each have 8 input channels and 8 output channels for processing digital information. Bit I/O unit 60 receives 8 digital signals including diagnostic signals related to the clutch motor 56, xovr motor 52, and select motor 54. Bit I/O unit 60 also receives input from switches of shifter 66 which indicate whether the driver has requested an upshift or downshift when operating the manual mode, as described above. Similarly, bit I/O unit 62 receives digital inputs from shifter 66, including the park switch, reverse switch, neutral switch, drive switch, manual switch. Each switch indicates if shifter 66 is in park, reverse, neutral, drive, and manual modes, respectively. Bit 1/O unit 62 also receives an input signal from the ignition to indicate whether the ignition is on. Bit I/O units 60 and 62 may have spare inputs to accommodate additional digital input as needed.

Bit I/O units 62 and 64 output digital signals to multiplexer 64 which receives 16 inputs and outputs each of the sixteen inputs to transmission vector unit 68. Transmission vector unit 68 also receives analog signals from demultiplexer 70. The analog signals are input from an analog to digital converter and multiplexer 72 which receives analog input signals and outputs digital signals to demultiplexer 70. Demultiplexer 70 outputs three digital signals corresponding to the analog input signals. The analog input signals represent the position of clutch motor 56, select motor 54, and the xovr motor 52. Transmission vector unit 68 also receives an input shaft revolution per minute (RPM) signal I RPM which varies in accordance with the speed of input shaft 20. Similarly, transmission vector unit 68 also receives an output RPM signal O RPM which varies in accordance with the rotational speed of output shaft 22. Finally, transmission vector unit 68 receives input from a mailbox which is part of a communication network (CN). Transmission vector unit 68 combines the inputs into a transmission input vector (TIV) which is output to various functional blocks of transmission controller 50. Also input to transmission controller 50 are inputs from a engine controller defined herein as electronic controller (EC) or engine controller 58, which is input to engine vector unit 74. Engine vector unit 74 combines the inputs into an engine input vector (EIV) which is output to various functional blocks of transmission controller 50.

The output from transmission vector unit 68 and engine vector unit 74 is input to logic controller 76. Logic controller 76 generates outputs which direct xovr motor 52, select motor 54, and clutch motor 56. Particularly, clutch motor controller 78 controls the clutch motor 56; xovr motor controller 80 controls xovr motor 52; and select motor controller 82 controls select motor 54. Clutch motor controller 78, xovr motor controller 80 and select motor controller 82 generate pulse width modulated (PWM) control signals for controlling the positions of the respective clutch motor 56, xovr motor 52, and select motor 54 in accordance with an error signal between the actual and desired positions of the respective motors. Typically this determination involves a proportional and derivative control which is well known to those skilled in the art.

Logic controller 76 also outputs control signals to LED display logic 84 which generates output signals to illuminate particular legs of the LED display to indicate the selected transmission gear. Logic controller 76 also outputs signals to engine controller 58, which is the same as engine controller 58 of FIG. 2, to control the output of engine 14, typically using a full cutoff signal. Engine controller 58 also receives the EIV from engine vector unit 74. Engine controller 58 generates control signals which are output by engine control outputs block 86. Logic controller 76 also outputs signals which control electric motor 40 through motor controller 44 to transmit mailboxes 88. Transmit mailboxes 88 can also provide information to a data network. Transmission controller 50 may be part of a data network, such as a communication network CN.

Similarly to the digital inputs which were input to bit I/O units 60 and 62, transmission controller 50 also uses a pair of bit I/O units 90 and 92 to control the output of digital signals from transmission controller 50. Bit I/O unit 90 outputs digital pulse width modulated (PWM) signals which control the direction and speed of operation of the respective clutch motor 56, xovr motor 52, and select motor 54. Bit I/O unit 90 also outputs a signal to indicate the state of the ignition. Bit I/O unit 92 outputs digital signals to control dynamic braking of xovr motor 52, select motor 54, and clutch motor 56. In addition, bit I/O unit 92 outputs digital signals to a LED display viewable by the driver to determine the present gear of the transmission 18. As one skilled in the are will recognize, the particular usage of output ports of bit I/O units 90 and 92, as well as bit I/O units 60 and 62, varies in accordance with the particular application and need not be exactly described herein.

Figure 4:
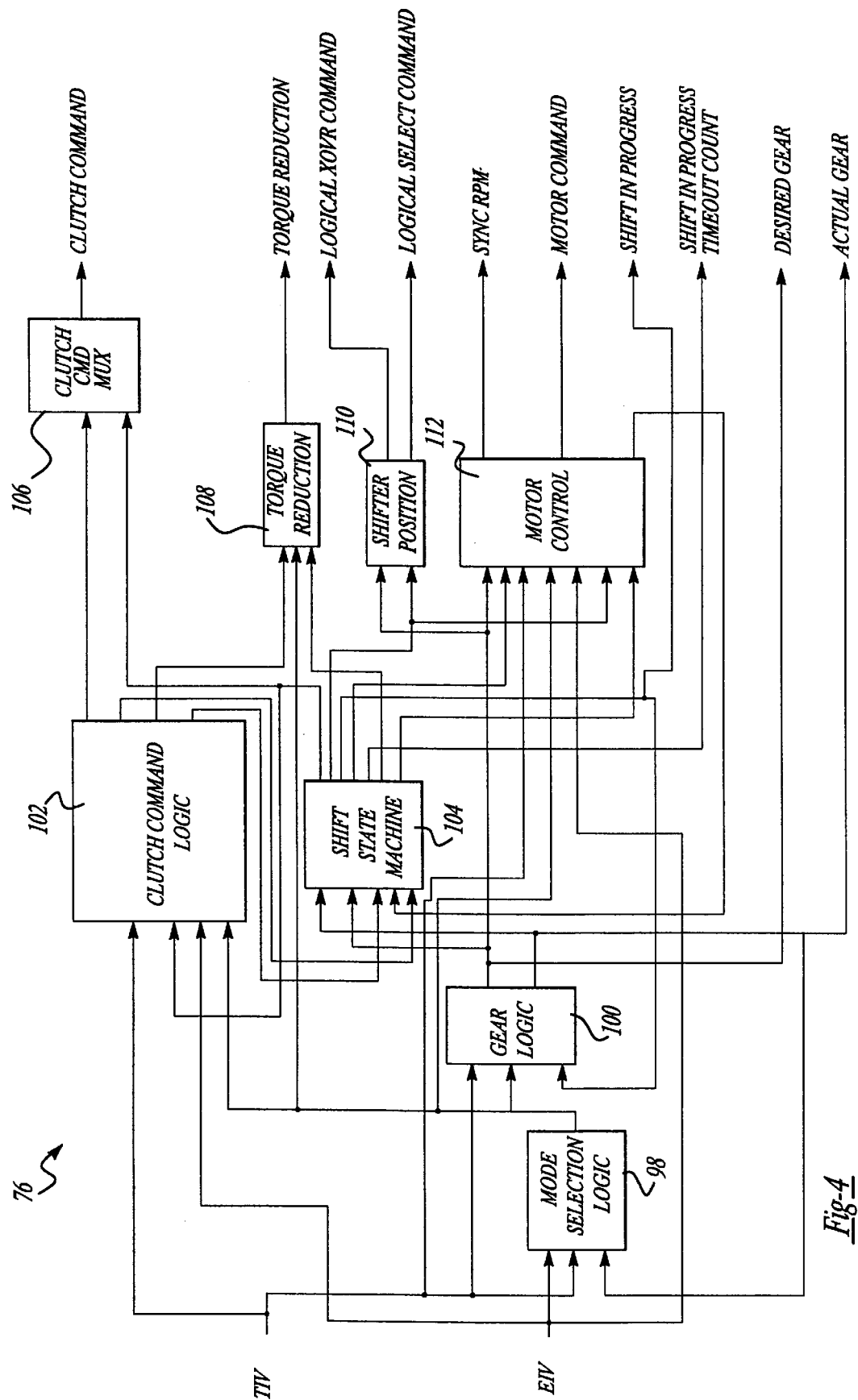
FIG. 4 is a block diagram of a logic controller portion of the transmission controller of FIG. 3.

FIG. 4 depicts an expanded block diagram of logic controller 76 of FIG. 3. Logic controller 76, as described with respect to FIG. 3, receives transmission inputs from transmission vector unit 68 in the form of transmission input vector (TIV) and engine inputs from engine vector unit 74 in the form of engine input vector (EIV). Selected data from the TIV and the EIV are used to determine the command outputs from logic controller 76. In logic controller 76, control begins at mode selection logic 98. There are 9 modes of operation for transmission 18, these modes include the following:

TABLE 1

| MODE | DESCRIPTION |
| --- | --- |
| 8 | Park neutral mode |
| 7 | Reverse mode |
| 6 | Idle drive mode |
| 5 | Regenerative braking mode |
| 4 | Downshift mode |
| 3 | Coast mode |
| 2 | Upshift mode |
| 1 | Kickdown mode |
| 0 | Drive mode |

As will be described further herein, mode selection logic 98 determines the preferred mode of operation. The output from mode selection logic 98 is input to gear logic 100. Gear logic 100 determines the desired operating gear for transmission 18. Based on the output of mode selection logic 98 and gear logic 100, clutch command logic 102 and shift state machine 104 generate outputs to control transmission 18. In particular, clutch command logic 102 outputs a desired clutch position which is input to clutch command multiplexer 106. Multiplexer 106 receives as input a desired clutch position from clutch command logic 102 and a clutch motor enable signal from shift state machine 104. Clutch command multiplexer 106 outputs a composite clutch command comprising the desired clutch position and the clutch motor enable signal.

Clutch command logic 102 also outputs a signal to indicate the need for torque reduction of engine 14 of FIG. 1 to torque reduction block 108. Also, input to torque reduction block 108 is a mode signal from mode selection logic 98 and a launch signal from shift state machine 104. The launch signal prevents a torque reduction in situations in which the vehicle is at rest, but is in the process of moving from the at rest position. Torque reduction block 108 outputs a torque reduction signal to engine controller 58 when it is determined that engine torque should be reduced. Logic controller 76 also includes a shifter position block 110 which receives a shift command from shift state machine 104 and a desired gear number from gear logic 100. Shifter position block 110 outputs a pair of control commands to control operation of xovr motor 52 and select motor 54 to shift the gears of transmission 18 to the desired position.

Logic controller 76 also includes a motor control block 112 to control electric motor 40. Motor control block 112 receives a plurality of inputs and generates commands for operating electric motor 40, which is connected to the input shaft 20 of transmission 18. Motor control block 112 outputs a synchronize RPM signal, which is the desired RPM of input shaft 20 to enable synchronization, thereby enabling a smooth engagement of the next gear to be engaged. Motor control block 112 also outputs a motor command to activate electric motor 40 at a desired speed or torque and direction as may be necessary.

Logic controller 76 also outputs additional information. This information includes a shift in progress signal, a shift in progress timeout count, a desired gear signal, and the actual gear signal. These outputs may be used by one or a number of clutch motor controller 78, xovr motor controller 80, select motor controller 82, LED display logic 84, or engine control outputs block 86.

Figure 5:
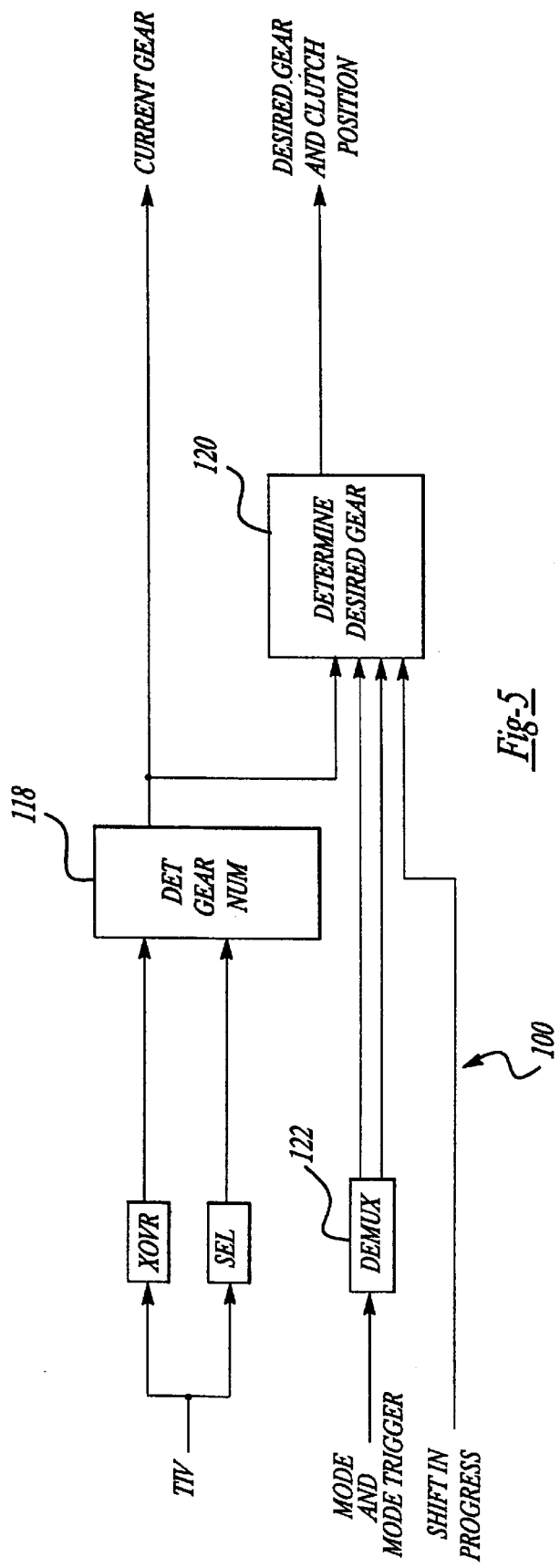
FIG. 5 is an expanded block diagram of the gear logic section of the logic controller of FIG. 4.

FIG. 5 depicts an expanded block diagram of gear logic 100 of FIG. 4. In FIG. 5, the position of the xovr motor 52 and select motor 54 is input from TIV to determine gear number 118. Determine gear number 118 determines the gear that transmission 18 is presently in based on the position of the xovr motor 52 and select motor 54. Determine gear number 118 outputs the current gear or if transmission 18 is in neutral, determine gear number 118 outputs a zero if transmission 18 is between gears. Determine gear number 118 outputs the current gear number to determine desired gear 120. Determine desired gear 120 also receives the mode and mode trigger signals which are input to demultiplexer 122. Demultiplexer 122 receives a single line input having both mode and mode trigger information signals and demultiplexes the input into individual mode and mode trigger information which is input to determine desired gear 120. Determine desired gear 120 also receives as input a shift in progress flag which indicates whether a shift is in progress. Based on the inputs, determine desired gear 120 outputs the desired gear number and the desired clutch position for use throughout logic controller 76 of FIG. 4.

With regard to operation of determine desired gear 120, determine desired gear 120 determines the desired gear and also determines the desired clutch position. In order to determine a desired gear, determine desired gear 120 does so in accordance with the current mode as described in Table 1 and the current gear. The current gear and the mode are input to a lookup table which then outputs a next gear which may be the desired gear. A test is then done to determine whether the desired gear should be updated in accordance with whether a shift is in progress or the vehicle is in reverse mode and the state of the mode trigger. For example, if the vehicle is in mode 0, or drive mode, and the mode changes to mode 2 or upshift mode and the mode trigger is activated, the next desired gear is incremented to the actual gear plus 1 only, if a shift is not in progress. Determine desired gear 120 also outputs the desired clutch position as engaged vehicle is in either drive, upshift, or kickdown modes. Otherwise, the desired clutch position is disengaged.

Figure 6:
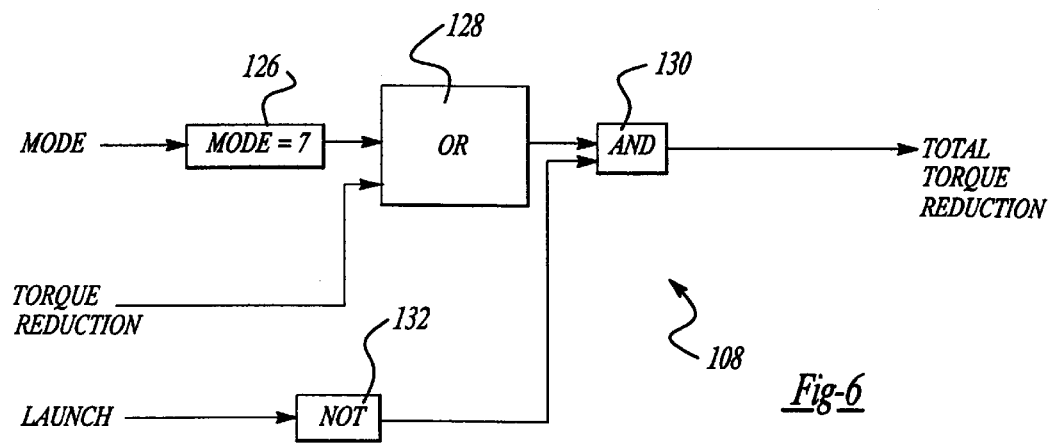
FIG. 6 is an expanded block diagram of the torque reduction block of the logic controller of FIG. 4.

As described above, gear logic 100, clutch command logic 102, and shift state machine 104 generate outputs to a number of command blocks which effect operation of transmission 18. More particularly, torque reduction block 108 of FIG. 4 receives as input the outputs from these blocks and generates an output command to reduce torque of engine 14 where appropriate. FIG. 6 depicts an expanded block diagram of torque reduction block 108. Torque reduction block 108 has three inputs: the mode, the torque reduction request, and the launch command. The mode is input to mode test block 126. Mode test block 126 tests the mode to determine if transmission 18 is in reverse mode (mode 7). If so, mode test block 126 outputs a logical true indicating this condition. If the mode is not mode 7, mode test block 126 outputs a logical false is indicating the mode is other than mode 7. The output from mode test block 126 is input to OR gate 128. A second input to OR gate 128 is the torque reduction request. OR gate 128 outputs a logic value of true if either the vehicle transmission mode is 7 (reverse mode) or a torque reduction request is detected. The output from logical OR gate 128 is input to logical AND gate 130. Logical AND gate 130 compares the input from logical OR gate 128 with the inverse of the launch flag. If the inputs match, torque reduction block 108 outputs a torque reduction signal. Otherwise, torque reduction block 108 does not output a torque reduction signal. In other words, if either the transmission 18 is in reverse mode (mode 7) or a torque reduction request is detected and the vehicle is not in launch mode, a torque reduction signal is output by torque reduction block 108. Conversely, if the vehicle is not in reverse mode (mode 7) and there is no torque reduction request or the vehicle is being launched, torque reduction block 108 does not output a torque reduction request.

Figure 7:
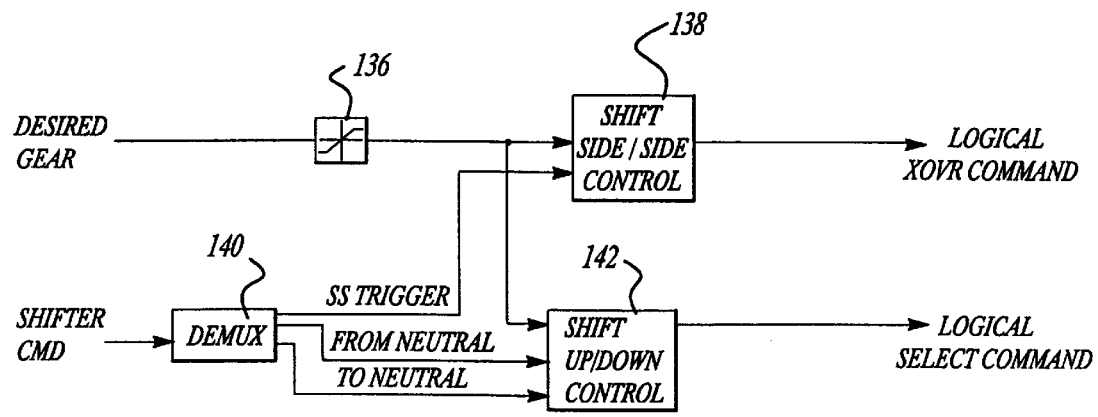
FIG. 7 is an expanded block diagram of the shifter position block of the logic controller of FIG. 4.

Logic controller 76 also includes a shifter position block 110 which generates control signals to operate xovr motor 52 and select motor 54. Shifter position block 110 receives a desired gear input from gear logic 100 and also receives shifter commands from shift state machine 104. Shifter position block 110 determines commands to position xovr motor 52 and select motor 54 based on the desired gear and the present shifter position. As shown in FIG. 7, shifter position block 110 receives a desired gear input from gear logic 100. The desired gear is input to limiter 136 which fixes the value of the desired gear if the desired gear is above or below a predetermined threshold. Shifter position block 110 also receives multiple shifter commands on a single control line. The shifter commands are demultiplexed by demultiplexer 140 into signals indicating whether the shifter is being moved to neutral from neutral, and an SS trigger signal, which indicates when to move the shift lever from side to side based on the shift sequence in the shift state machine 104. The desired gear and the SS trigger are input to shift side/side control 138. Shift side/side control 138 outputs a logical xovr command to operate xovr motor 52. Similarly, the desired gear, and a pair of signals indicating whether the shift is from neutral or to neutral are input to shift up/down control 142. Shift up/down control 142 outputs a logical select command to control the position of select motor 54 in accordance with the commands from shifter 66 and the desired gear output by gear logic 100.

Figure 8:
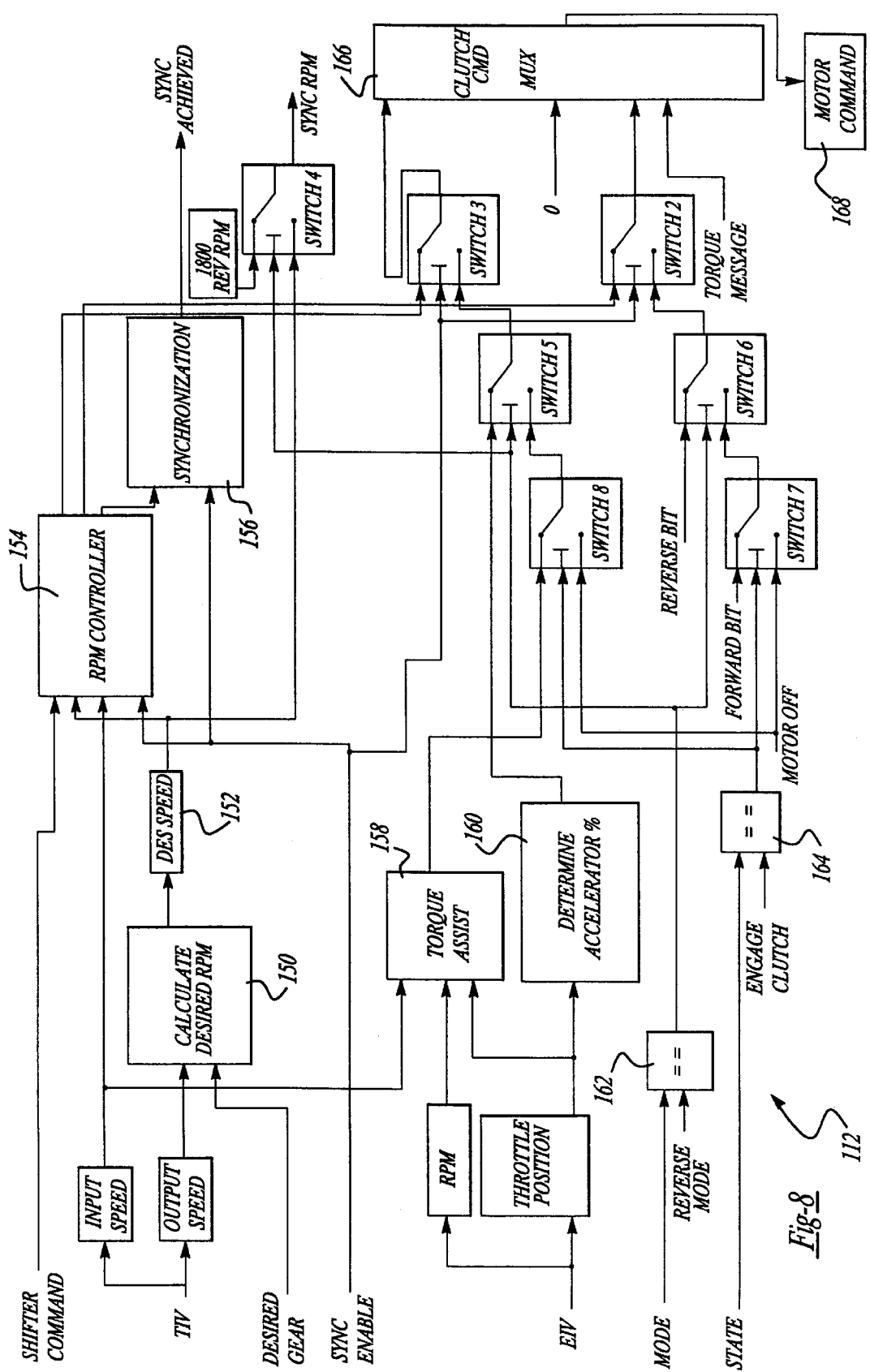
FIG. 8 is an expanded block diagram of the motor control block of the logic controller of FIG. 4.

Logic controller 76 also generates motor control commands through motor control block 112. These commands control operation of electric motor 40 through motor controller 44. As described above, electric motor 40 is connected to input shaft 20 of transmission 18 in order to control synchronization between input shaft 20 and output shaft 22 and to effect forward assist or reverse gear of transmission 18. As shown at FIG. 8, motor control block 112 receives as input the shifter command from shift state machine 104, the TIV, the desired gear from gear logic 100, the EIV, the mode, and the present state of the clutch, whether engaged or disengaged. From the TIV, motor control block 112 utilizes the speed of the input shaft, or the input speed, and the speed of the output shaft, or the output speed. From the EIV, motor control block 112 utilizes engine RPM and throttle position. Motor control block 112 includes a calculate desired RPM block 1 50 which receives as input the speed of output shaft 22 and the desired gear. Based on the speed of output shaft 22 and the desired gear, calculate desired RPM block 150 determines a desired speed 152 that enables synchronization of input shaft 20 to effect smooth engagement of the next gear to be selected. The desired speed 152 is input to RPM controller 154.

Additional inputs to RPM controller 154 include the input speed, the shifter command, and a synchronization enabled signal. RPM controller 154 generates command signals to control the speed of electric motor 40 in order to enable synchronization between input shaft 20 and output shaft 22. Output from RPM controller 154 is input to synchronization block 156, as is the RPM error, or the difference between actual and the desired input shaft speed. Synchronization block 156 outputs a flag indicating that synchronization has been achieved.

Motor control block 112 also includes a torque assist block 158. Torque assist block 158 receives as input of the speed of input shaft 20 or the input speed, the engine RPM, and the throttle position. Torque assist block 158 determines the assist to be applied by electric motor 40 to effect a hybrid operation of transmission 18 between engine 14 and electric motor 40. The throttle position is also used by determine accelerator percentage block 160 to indicate the acceleration required by the vehicle operator. The further that the operator depresses the accelerator, the greater the accelerator percentage. This value is used when electric motor 40 is used to reverse the vehicle.

Also input to motor control block 112 is the transmission mode. The transmission mode is inspected at comparator 162 to determine if transmission 18 is in reverse mode. If transmission 18 is in reverse mode, a logical flag is set to true. Similarly, the clutch engaging state is input to motor control block 112 and is compared against the clutch engaging signal at comparator 164 to determine if transmission 18 is engaging the clutch 16.

Motor control block 112 has two trios of cascaded switches which control the operating torque and direction of motor 40. Switches 7, 6, and 2 are cascaded to control the direction of operation of motor 40. Switches 8, 5, and 3 are cascaded to control the torque output of motor 40. Each switch 2–3 and 5–8 enables selection from one of two inputs as an output in accordance with a third, selector input. Further, each switch of the direction trio is paired with a corresponding switch of the torque trio and shares a common signal applied to the selector input. Specifically, switches 7 and 8, switches 6 and 5, and switches 2 and 3 have common signals input to their selector inputs. These corresponding switches control parameters which determine operation of electric motor 40. In particular, the output from comparator 164 is input to the selector input of switches 7 and 8. The output of comparator 162 is input to the selector input of switches 6 and 5. The synchronization enabled flag is input of the selector input to switches 2 and 3.

In operation, switches 2–3 and 5–8 enable the selection of particular data streams in order to place electric motor 40 in reverse mode, transmission assist mode, synchronization mode, or inoperative mode. Switches 7 and 8 receive as data selection inputs a signal indicating whether the clutch is being engaged. If clutch 16 is being engaged, switch 7 outputs a forward bit or signal to a first input of switch 6. The other input to switch 6 is a reverse bit or signal. Similarly, if clutch 16 is being engaged, switch 8 outputs a torque assist command to one input of switch 5. The other input of switch 5 receives the accelerator percentage. If clutch 16 is not being engaged, a motor off signal is output from switches 7 and 8.

A signal indicating whether the transmission is in reverse mode is input to the data selection inputs of switches 5 and 6. If the vehicle is in reverse mode, a reverse bit or signal is output to switch 2 from switch 6 and the accelerator position is output from switch 5 to switch 3. If the vehicle is not in reverse mode, switch 6 outputs a forward signal or motor off signal to switch 2, and switch 5 outputs the torque assist or motor off signal to switch 3.

Switches 2 and 3 receive as inputs a synchronization enable signal. If synchronization is enabled, the direction and RPM output by RPM controller 154 is output from switches 2 and 3, respectively, to clutch command multiplexer 166. If synchronization is not enabled, switch 3 outputs the signal received from switch 5 to clutch command multiplexer 166. Similarly, if synchronization is not enabled, switch 2 outputs the signal received from switch 6 to clutch command multiplexer 166. A torque message is also input to clutch command multiplexer 166 which provides information if a torque is required to operate electric motor 40. This information may be broadcast over the communications network CN for electric motor controller 44 and, as well as for other systems to use. Clutch command multiplexer 166 outputs a resultant motor command 168 by multiplexing the torque request, direction request, zero and a torque message.

Motor control block 112 also outputs other data and command signals. For example if transmission 18 is in reverse mode, switch 4 outputs a synchronization RPM of 1800 revolutions per minute. If transmission 18 is not in reverse mode, switch 4 outputs a desired RPM to achieve synchronization of input shaft 20 to the desired gear.

From the foregoing, one skilled in the art will recognize that if synchronization is enabled, switch 2 outputs a directional command to electric motor 40 in order to cause electric motor 40 to speed up or slow down input shaft 20, depending upon the relative speeds of input shaft 20 and output shaft 22. This directional command is received from RPM controller 154. Similarly, if synchronization is enabled, switch 3 outputs a torque request command generated by RPM controller 154 in accordance with the relative speeds between input shaft 20 and output shaft 22. If synchronization is not enabled, electric motor 40 will be placed in non-synchronization mode in which electric motor will remain off, go into reverse mode, or assist engine 14. If transmission 18 is in reverse mode, the motor will operate in a reverse direction to cause drive wheels 32 to operate in a reverse direction. If the vehicle is not in reverse mode and the clutch is engaged, electric motor 40 will operate in an assist mode to assist engine 14 in operating drive wheels 32. If transmission 18 is not in reverse mode and the clutch is not engaging, the motor will remain off.

Figure 9:
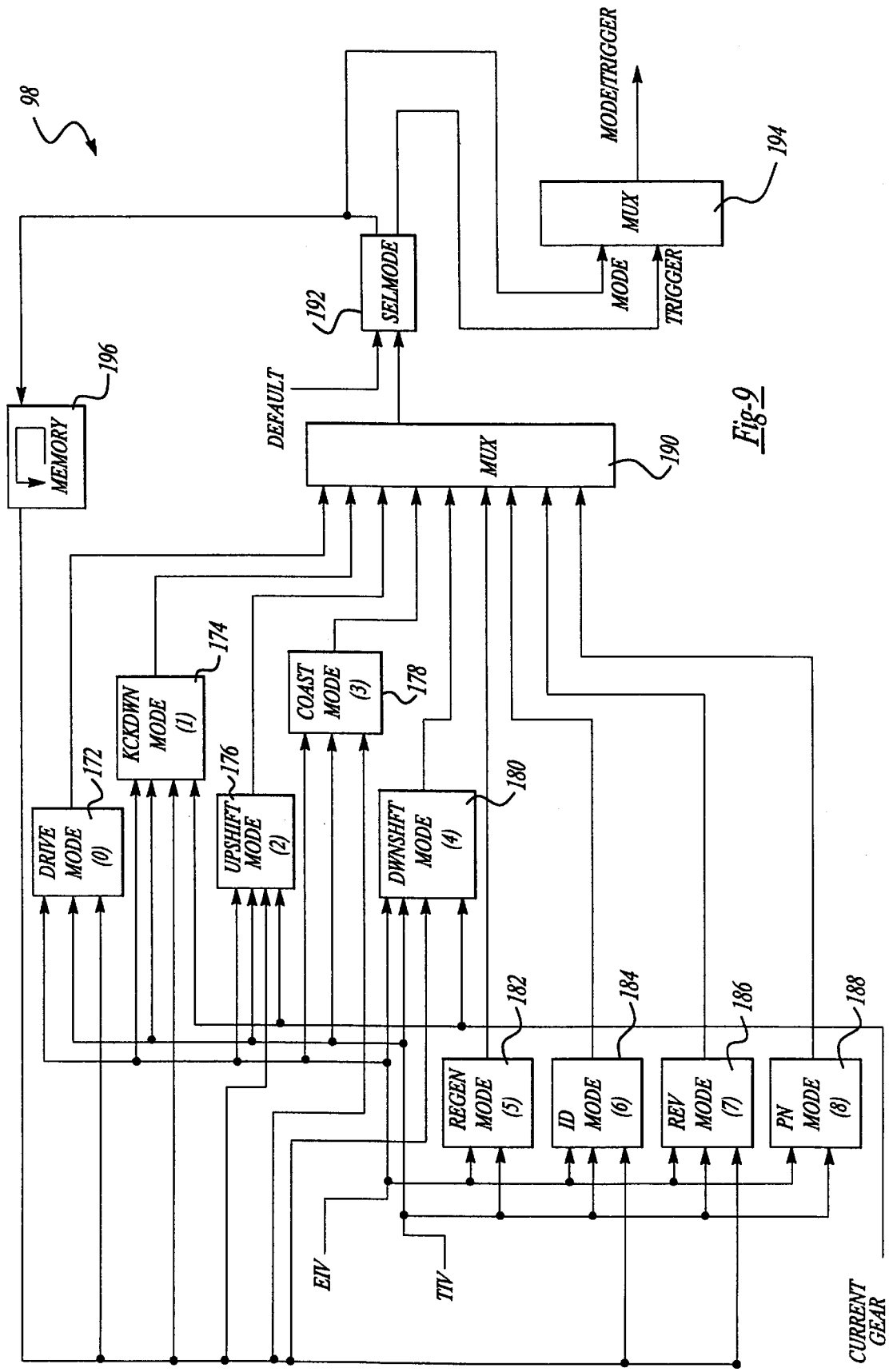
FIG. 9 is an expanded block diagram of mode selection logic of the logic controller of FIG. 4.

Returning to operation of logic controller 76, FIG. 9 depicts an expanded block diagram of mode selection logic 98. Mode selection logic 98 receives as inputs the EIV and the TIV. Mode selection logic 98 also receives as input the current gear as output by gear logic 100. As discussed with respect to Table 1, transmission 18 has 9 modes of operation, modes 0–8. Based on selected inputs from the EIV and TIV, each block 172–188 tests for a particular mode and outputs a logical value if transmission 18 is in that particular mode. The result of each mode test is output to multiplexer 190 which multiplexes the output from each mode test block to select mode block 192. Select mode block 192 evaluates all mode tests which are true and outputs the highest numerical mode which is on or true as the selected mode to multiplexer 194. Select mode block 192 also outputs a mode trigger signal to multiplexer 194. Thus, multiplexer 194 outputs both a mode and a mode trigger signal. Select mode block 192 also receives a default input, which is typically park neutral mode (mode 8). The previous mode output by select mode block 192 is stored in memory 196 for determining future transmission modes.

With further reference with operation of select mode block 192, select mode block 192 defaults to the higher of the numerical modes. For example, mode 8 (park/neutral mode) is selected over mode 7 (reverse mode), which is selected over mode 6 (idle drive mode), which is selected over mode 5 (reject mode), etc. The following Table 2 provides a criteria for determining the particular mode of operation. Table 2 presents the mode, a description of the mode, and criteria for being in that particular mode.

TABLE 2

| MODE | DESCRIPTION | CRITERIA |
| --- | --- | --- |
| 8 | Park neutral mode | Shift lever is in park or neutral or engine is stalled |
| 7 | Reverse mode | Shift lever is in reverse and (accelerator pedal is zero and vehicle speed is 0 mph and brake is applied) or (previous mode was reverse). |
| 6 | Idle drive mode | Shift lever is in drive or manual and (the accelerator pedal is zero and vehicle speed is 0 mph and (the brake is applied or the previous mode was idle drive mode or below)). |
| 5 | Regen mode | Brake is on and vehicle speed is above zero mph. |
| 4 | Downshift mode | ((Shift lever is in drive and the shift schedule calls for an downshift) or (the shift lever is in manual and downshift)) and the accelerator pedal is coast throttle and previous mode is 4 or less. |
| 3 | Coast mode | Shift lever is in drive or manual and (the throttle is less than coast throttle and engine RPM is below |

TABLE 2-continued

| MODE | DESCRIPTION | CRITERIA |
|---|---|---|
| 2 | Upshift mode | input shaft speed +100 RPM) and (previous mode is 1,3, or 4). (Shift lever is in drive and the shift schedule calls for a upshift) or (the shift lever is in manual and upshift) and )RPM is between minimum and maximum upshift RPMs) and previous mode is 4 or less. |
| 1 | Kickdown mode | ((Shift lever is in drive and the shift schedule calls for a downshift) or (the shift lever is in manual and downshift)) and the accelerator pedal is above coast throttle and previous mode is 4 or less. |
| 0 | Drive mode | Shift lever is in drive or manual and (the accelerator pedal is not zero or the vehicle speed is 0 mph) and the previous mode was mode 6 or less. |

Figure 10:
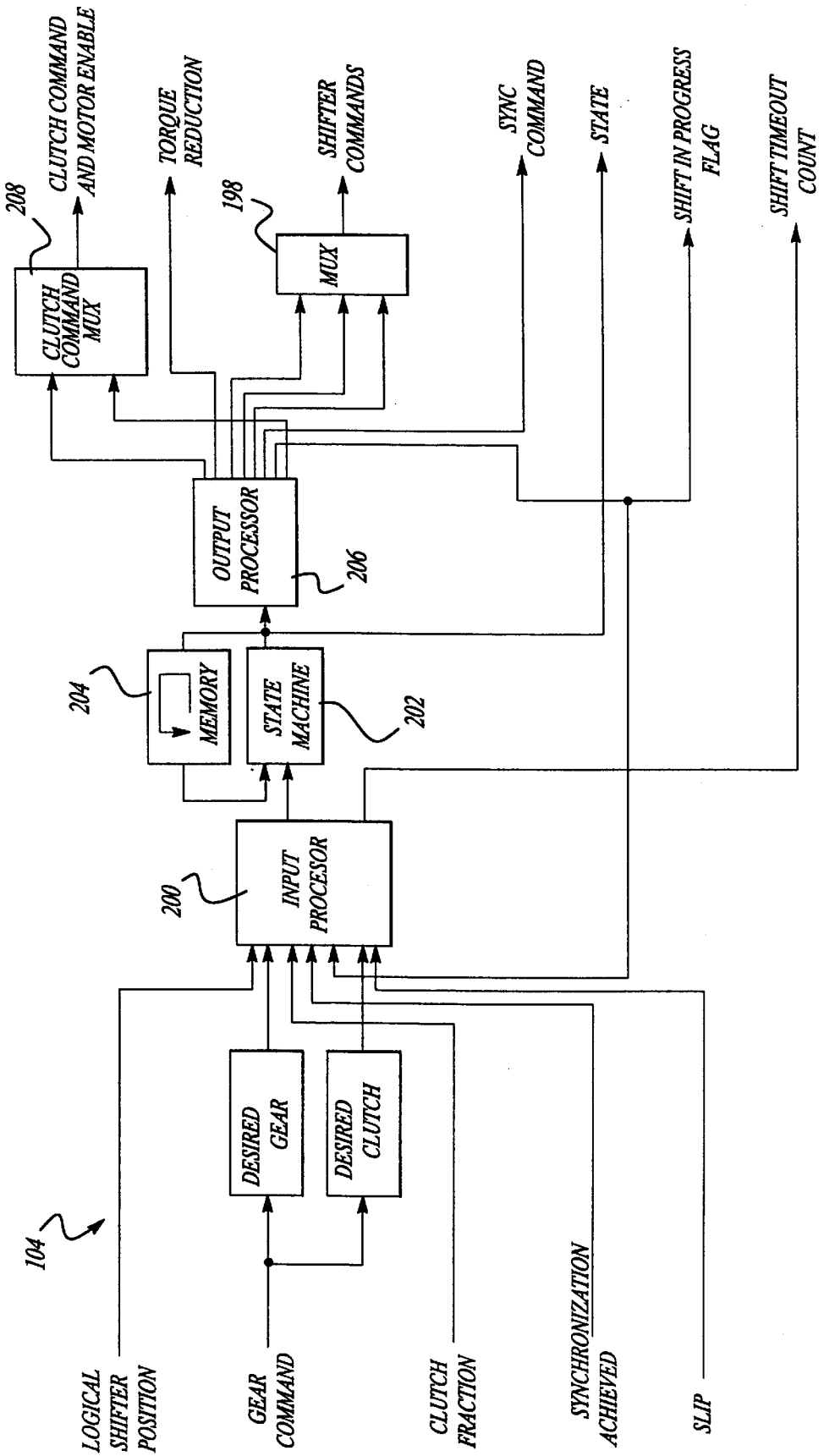
FIG. 10 is an expanded block diagram of the shift state machine of the logic controller of FIG. 4.

Returning to FIG. 4, logic controller 76 also includes a shift state machine 104. Shift state machine 104 generates numerous outputs which control the operation of transmission 14. FIG. 10 depicts an expanded block diagram of shift state machine 104 of FIG. 4. Shift state machine 104 receives as input the logical shifter position which is the logical position of xovr motor 52, and select motor 54; a gear command, including a desired gear and a desired clutch; a clutch fraction, which is the percentage of total engagement of clutch 16; a synchronization achieved signal; and a slip signal to indicate whether clutch 16 is slipping with respect to engine 14. These inputs are applied to an input processor 200 which processes the input and output signals for input to state machine 202. State machine 202 determines the next state of transmission 18 based on existing conditions and the previous state, which is stored in memory 204. State machine 202 outputs the next state to output processor 206. Output processor 206 generates clutch commands to clutch command multiplexer 208, which outputs multiplexed signal having a clutch command and a motor enable signal. Output processor 206 also outputs a torque reduction command which is output by state machine 202. Output processor also outputs shifter commands to multiplexer 198 which outputs the shifter commands in a multiplexed signal. Output processor 206 also outputs a synchronization command, which specifies when to synchronize the input shaft, and a shift in progress flag. Shift state machine 104 shift timeout count, which is output by input processor 200.

Figure 11A:
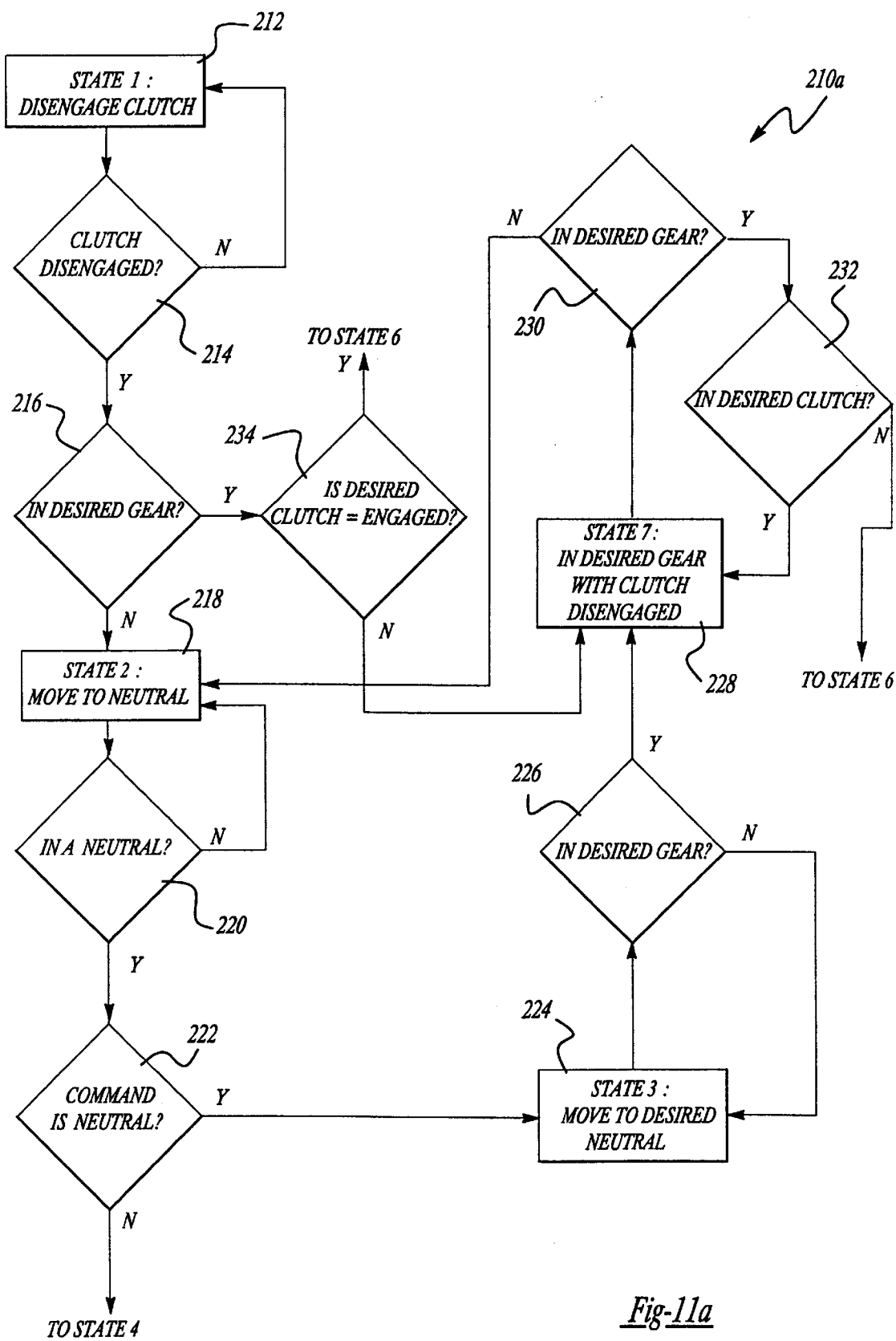
FIGS. 11a, 11b, and 11c are flow diagrams showing state transitions of the shift state machine of FIG. 10.
Figure 11B:
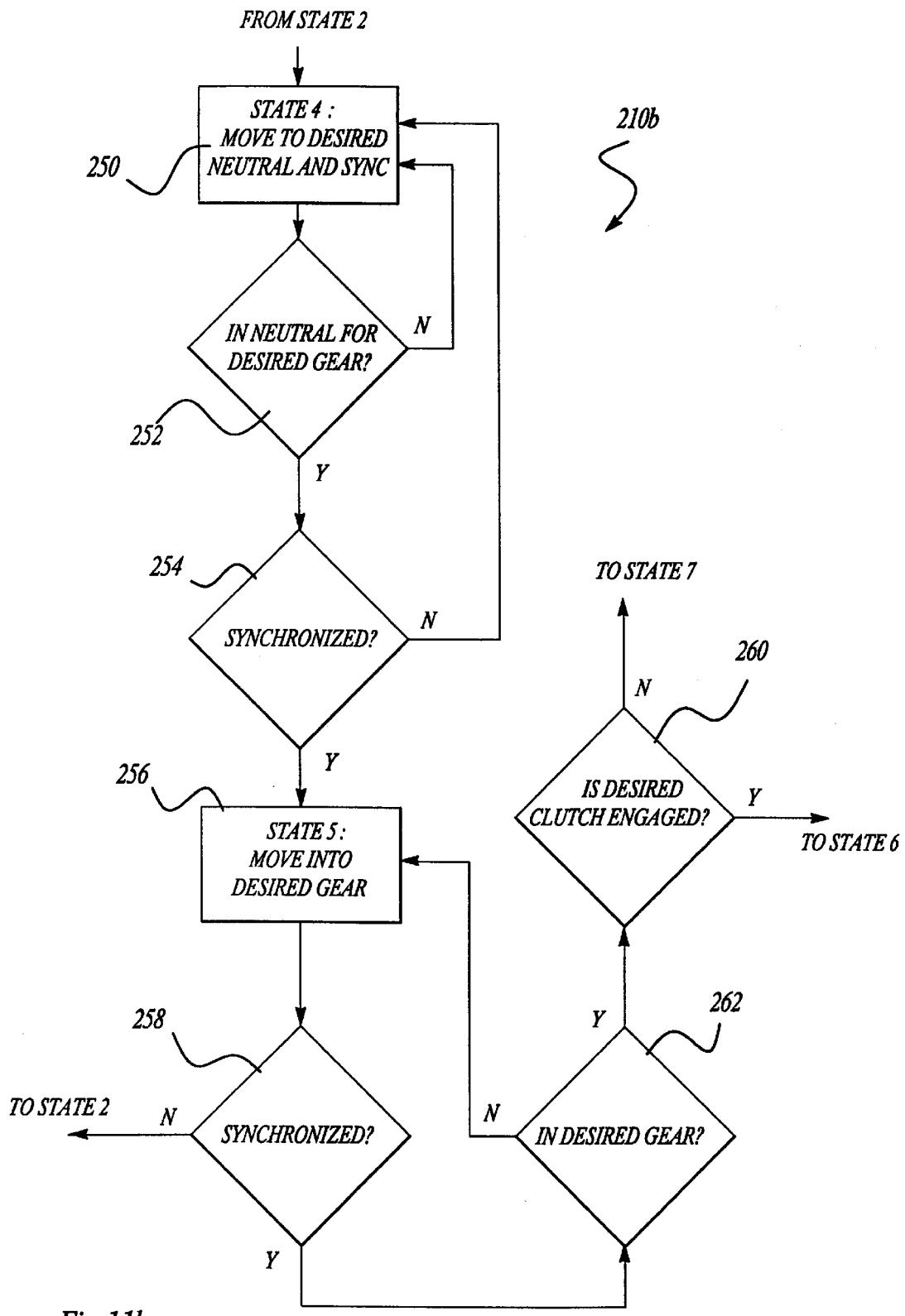
Figure 11C:
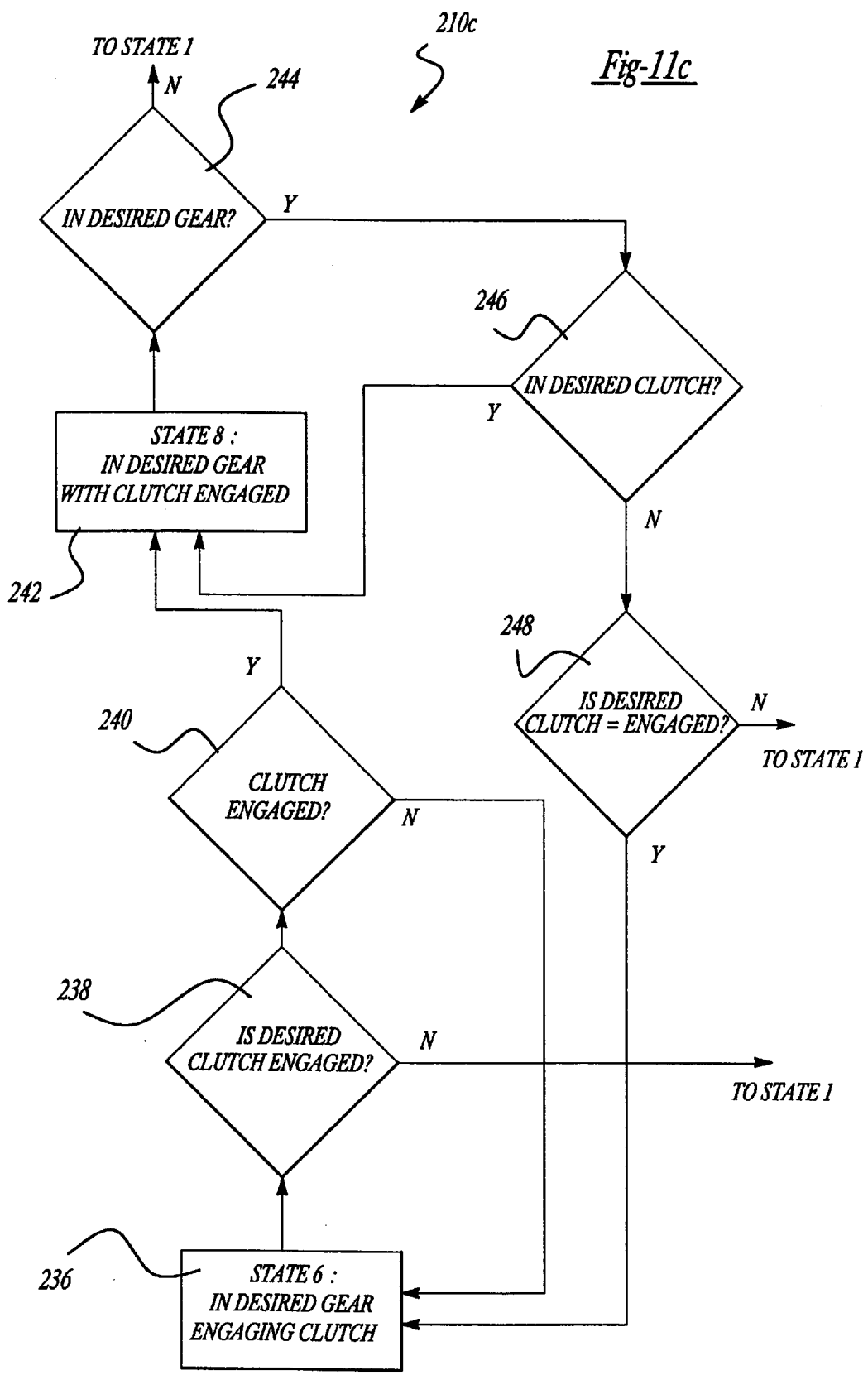

With reference with FIGS. 11a–11c, a flow diagram depicting operation of state machine 202 is shown. In FIGS. 11a–11c, state machine 202 has 8 states, which differ from the transmission modes of operation. Operation of state machine 202 begins at the previous state determined by state machine 202. For example, if at time $t_0$, state machine 202 is in state 6, at time $t_1$, state 6 would be the initial state for determine the next state. In the present example, assume state 1 is the previous state at time to, and the state is being determined at time $t_1$. Prior to describing flow diagram 210a–c representing state machine 202, each state will be briefly described in Table 3.

TABLE 3

| STATE | DESCRIPTION |
|---|---|
| 1 | Disengage clutch |
| 2 | Move to neutral |
| 3 | Move to desired neutral |
| 4 | Move to desired neutral and synchronize |

TABLE 3-continued

| STATE | DESCRIPTION |
|---|---|
| 5 | Move into desired gear |
| 6 | In desired gear, engaging clutch |
| 7 | In desired gear with clutch disengaged |
| 8 | In desired gear with clutch engaged |

As stated above, in describing the flow diagram 210a–c, assume that the initial state is state 1. One skilled in the art will recognize that each of the 8 states may be appropriate as a starting state. Control begins at state 1 (212) at which the clutch is disengaged. From state 1, control passes to test block 214 to determine if the clutch is disengaged. If the clutch is not disengaged, the next state is state 1 (212). If the clutch is disengaged, control passes to test block (216) in which a test is performed to determine if transmission 18 is in the desired gear. If transmission 18 is not in the desired gear, control passes to state 2 (218) in which transmission 18 shifts to neutral. From state 2 (218), control passes to test block 220 in which a test is performed to determine if the transmission 18 is in neutral. If transmission 18 is not in neutral, control passes back to state 2 (218). If transmission 18 is in neutral, control passes to test block 222 which performs a test to determine if the present command requests a shift to neutral. If the present command is a shift to neutral, control passes to state 3 (224) in which transmission 18 is shifted to desired neutral. From state 3 (224), control passes to test block 226 in which a test is performed to determine if transmission 18 is in the desired gear. If transmission 18 is not in the desired gear, control returns to state 3 (224). If transmission 18 is in the desired gear, control passes to state 7 (228) in which transmission 18 is in the desired gear with the clutch disengaged. From state 7 (228), control passes to test block 230 in which a test is performed to determine if transmission 18 is in the desired gear. If transmission 18 is not in the desired gear, control passes to state 2 (218), where transmission 18 is shifted to neutral. Control then proceeds as described above.

Returning to test block 230, if transmission 18 is in the desired gear, control passes to test block 232 in which a test is performed if transmission 18 is in the desired clutch, whether engaged or disengaged. If transmission 18 is in the desired clutch, control returns to state 7 (228). Returning to test block 216, from state 1 (212), in which the clutch is disengaged, if transmission 18 is in the desired gear, control passes to test block 234 in which a test is performed to determine if the desired clutch is equal to engaged. If the desired clutch is not equal to engaged, control passes to state 7 (228) in which transmission 18 is in the desired gear with clutch disengaged.

In test block 234, if the desired clutch is equal to engaged or in test block 232 if transmission 18 is not in the desired clutch, control passes to state 6 (236) of FIG. 11c in which transmission 18 is in the desired gear and is engaging the clutch. From state 6 (236), control passes to test block 238 in which a test is performed to determine if the desired clutch is equal to engaged. If the desired clutch is not equal to engaged, control passes to state 1 (212) where the clutch is disengaged. If the desired clutch is equal to engaged, control passes to test block 240 in which a test is performed to determine if the clutch is engaged. If the clutch is not engaged, control returns to state 6 (236). If the clutch is engaged, control passes to state 8 (242). In state 8 (242), transmission 18 is in the desired gear with the clutch engaged. From state 8, control passes to test block 244 in which a test is performed to determine if transmission 18 is in the desired gear. If transmission 18 is not in the desired gear, control passes to state 1 (212). If transmission 18 is in the desired gear, control passes to test block 246 in which a test is performed to determine if transmission 18 is in the desired clutch. If transmission 18 is in the desired clutch, control passes to state 8 (242). If transmission 18 is not in the desired clutch, control passes to test block 248 in which a test is performed to determine if the desired clutch is equal to engaged. If the desired clutch is equal to engaged, control passes to state 6 (236). If the desired clutch is not engaged, control passes to state 1 (212).

Returning to test block 222 of flow diagram from 210a, if the command is not neutral, control passes to state 4 in which transmission 18 is shifted to the desired neutral and synchronized. From state 4, control passes to test block 252 in which a test is performed to determine if transmission 18 is in neutral for the desired gear. If transmission 18 is not in neutral for the desired gear, control returns to state 4 (250). If the transmission is in neutral for desired gear, control passes to test block 254 in which a test is performed to determine if transmission 18 is synchronized. If transmission 18 is not synchronized, control again returns to state 4 (250). If transmission 18 is synchronized, control passes to state 5 (256) in which transmission 18 is shifted to the desired gear. From state 5, control passes to test block 258 in which a test is performed to determine if transmission 18 is synchronized. If transmission 18 is synchronized, control passes to test block 262 in which a test is performed to determine if transmission 18 is in the desired gear. If transmission 18 is not in the desired gear, control passes to state 5 (256). If transmission 18 is in the desired gear, control passes to test block 260 in which a test is performed to determine if the desired clutch is engaged. If the desired clutch is engaged, control passes to state 6 (236). If the desired clutch is not engaged, control passes to state 7 (228). Returning to test block 258 of FIG. 11b, if transmission 18 is not synchronized, control passes to state 2 (218) in which the transmission moves to neutral.

The output of state machine 202 of FIG. 10, as described in detail in FIGS. 11a–11c, is used by various portions of logic controller 76. For example, clutch command logic 102 utilizes the output to generate commands to vary the engagement of the clutch. FIG. 12 depicts an expanded block diagram of clutch command logic 102 of FIG. 4. Clutch command logic 102 receives as inputs the TIV, the clutch command, the EIV, and the mode and launch trigger command. From the TIV, clutch command logic 102 outputs the logical clutch position at block 270. The mode and trigger commands are input to launch or drive logic 272. Launch or drive logic 272 outputs a launch command. The launch command is output from clutch command logic 102. Launch or drive logic 272 also outputs a launch order which is input to clutch engagement command logic 274. Also input to clutch engagement command logic 274 are selected data from the TIV and the EIV. The desired clutch command or signal is also input to clutch engagement command logic 274. A logical true indicates that the desired clutch command is engaged, and a logical false indicates that the desired clutch is disengaged. As will be described in greater detail herein, clutch engagement command logic 274 outputs a clutch command to control engagement of the clutch, a slip value, and an engagement complete signal. The clutch command is input to a switch 276 which receives the desired clutch command signal as the select input. If the desired clutch command signal is a logical true switch 276 outputs the clutch command as output by clutch engagement command logic 274. If the desired clutch command signal is a logical false switch 276 outputs the disengaged clutch position from the logical clutch position block 270. Clutch command logic 102 also outputs the logical clutch position from logical clutch position block 270 and the slip value from clutch engagement command logic 274.

In operation, to be described in greater detail herein, clutch command logic 102 positions the clutch during launch and shift maneuvers. There are two types of clutch control used by clutch command logic 102. A first control is for launching or starting the vehicle from a stopped position. During launch, the desired clutch position is calculated by performing a summation of (1) the fully disengaged clutch position, (2) a term proportional to the accelerator position, (3) a term proportional to the difference between the engine RPM and desired launch RPM, (4) and a term proportional to the derivative of the difference between the engine RPM and launch RPM. The desired clutch position is updated each iteration until either the accelerator pedal is closed or the slip rate at the clutch, defined as a difference between the engine RPM and the input shaft speed, drops below a predetermined threshold.

A second type of control is to provide smooth clutch engagement while shifting gears. During an engagement, the desired clutch position is calculated by adding the fully disengaged clutch position plus a term proportional to the error between the actual slip and the desired slip. The rate of change of the desired clutch position is limited so that the clutch cannot disengage rapidly during engagement. The desired slip value is calculated by storing the initial slip value at the beginning of the engagement process and then decrementing the desired slip each iteration. The desired slip is decremented by an amount which is the sum of a term proportional to the engine RPM plus a term proportional to the accelerator position. The desired clutch position is updated each loop until the slip drops below a predetermined threshold.

Figure 13:
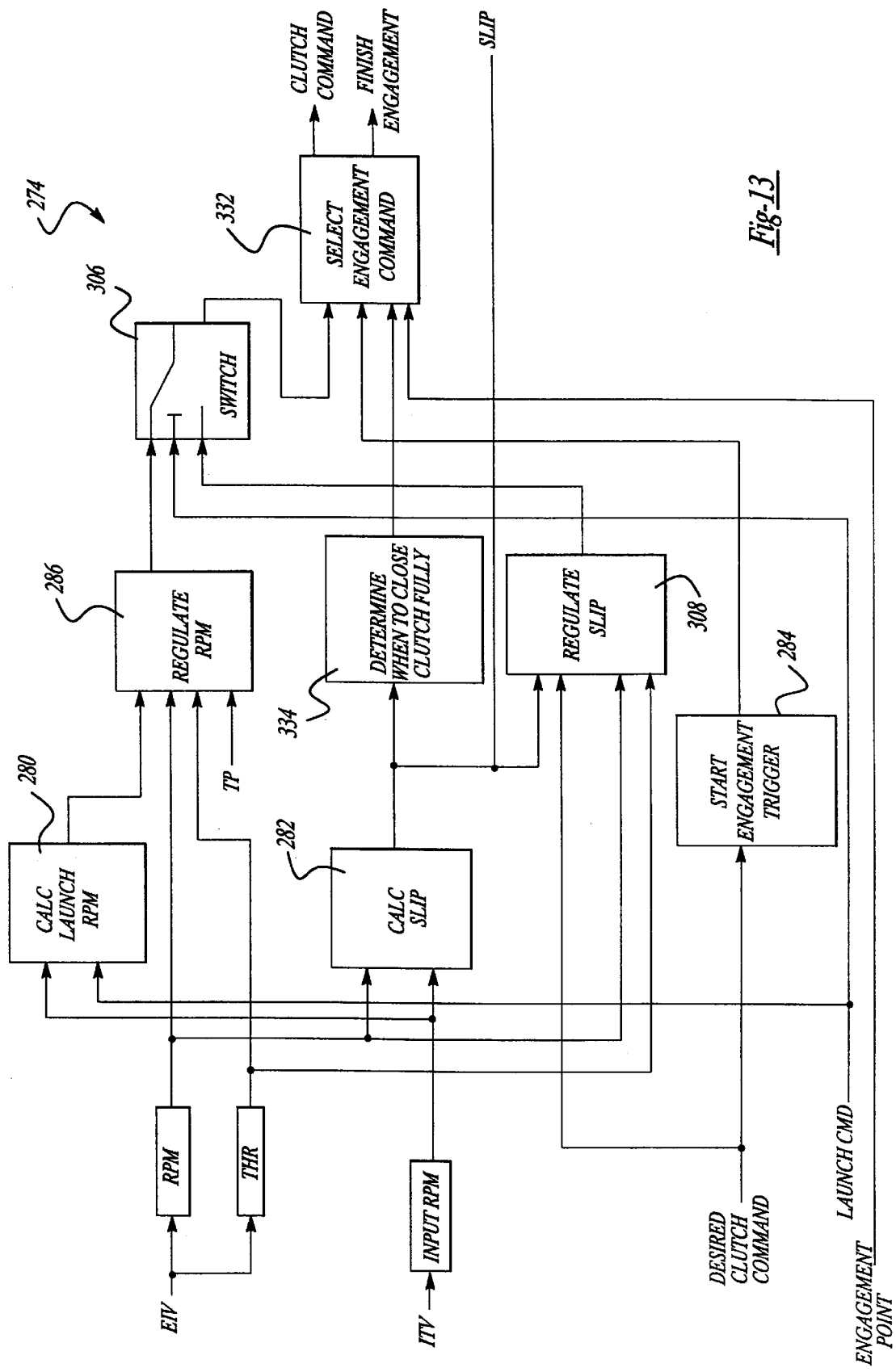
FIG. 13 is an expanded block diagram of clutch engagement command logic of the clutch command logic of FIG. 12.

With respect to a more detailed description of these two types of control, FIG. 13 depicts an expanded block diagram of clutch engagement command logic 274 of FIG. 12. As described above, clutch engagement command logic 274 receives as input the engine RPM and throttle position from the EIV and the input RPM or speed of input shaft 20, which is provided by the ITV. Also input to clutch engagement command logic 274 is the desired clutch command, the launch command, and the engagement point. The launch command is a logical value with a true indicating that the vehicle is in launch mode and a false indicating that the vehicle is not in launch mode. The engagement point is an analog value corresponding to the fully engaged position of the clutch.

In operation, clutch engagement command logic 274 calculates the launch RPM as shown at block 280. The launch RPM is calculated as an offset above the input RPM when the launch command begins. A second calculation which is performed by clutch engagement command logic 274 is a slip calculation as show at calculate slip block 282. The slip calculation is defined as the absolute value of the difference between engine RPM and input RPM. This value is output by calculate slip block 282. Upon receipt of a logical true desired clutch command, the engagement command trigger is initiated, as to shown at block 284.

As discussed above, if the clutch engagement command logic 274 is controlling engagement of the clutch during vehicle launch, the RPM of the engine must be regulated to effect a smooth vehicle launch. This calculation is performed at regulate RPM block 286. FIG. 14 depicts an expanded block diagram of regulate RPM block 286. Referring to FIG. 14, the actual engine RPM is subtracted from the desired engine RPM, which is determined by calculate launch RPM block 280, at summer 288 which outputs an error or difference signal. The difference between the desired engine RPM and actual engine RPM is output to a proportional differential filter 290 which performs a proportional differential calculation. The proportional term is determined by a proportional gain amplifier 292, which has a gain of 0.001 and which outputs the amplified term to a limiter 294 which places upper and lower limits on the proportional term. The limited term is output to a summer 296. To determine the differential term, the output of summer 288 is input to a filter 298 which takes the derivative of the error signal. The output of filter 298 is input to differential gain amplifier 300 having a gain of 0.00005. The output of differential gain amplifier 300 is also input to summer 296. A throttle position is input to amplifier 302 having a gain of −2.5, and the output of amplifier 302 is input to limiter 304. The output from limiter 304 is input to summer 296. Also input to summer 296 is the touch point which is the disengaged point of the clutch. At summer 296, the touch point, the proportional and differential terms of the difference between the desired engine RPM and the actual engine RPM, and the proportional throttle value are added and output as a desired output RPM. In operation, the regulate RPM block generally assumes that the clutch starts disengaged, and negative values input to summer 296 causes the clutch 16 to move towards full engagement.

Referring to FIG. 13, the output from regulate RPM block 286 is applied to a first input of switch 306. The second input to switch 306 is provided by regulate slip block to 308, as will be described herein. Switch 306 selects as output the regulated RPM or the regulated slip depending upon the launch command. If the vehicle is in a launch condition, switch 306 outputs the regulated RPM. If the vehicle is not in a launch condition, switch 306 outputs the regulated slip, for an engagement mode.

FIG. 15 is an expanded block diagram of regulate slip block 308. Regulate slip block 308 has as inputs the amount of slip as calculated by calculate slip block 282, the desired clutch command, engine RPM, and throttle position. The engine RPM is input to an amplifier 310 where a gain of 0.10 is applied. Similarly, the throttle position is input to an amplifier 312 where a gain of 700 is applied. The outputs from each respective amplifier are input to a summer 314 which adds the respective RPM and throttle position values. The output from summer 314 is input to a limiter to 316. The output from limiter 316 is input to generate slip command ramp block 318. Generate slip command ramp block 318 formulates a desired slip rate to be used when engaging the clutch. The generate slip command ramp block 318 generates a slip command which is input to summer 320 along with the present slip. The present slip is subtracted from the slip command ramp in order to determine an error between the desired slip and the actual slip. The slip error is input to amplifier 322 having a gain of 0.20. The output from amplifier 322 is input to limiter 324 which limits the upper and lower values of the slip error. The output from limiter 324 is input to reset integrator 326. Also input to reset integrator 326 is the inverted engagement command which is inverted at block 328. The inverted engagement command resets the integration when the clutch command is set to disengage. Reset integrator 326 integrates the slip error to further provide smooth engagement of the clutch 16. The output from reset integrator 326 is input to limiter 330. The output of limiter 330 is thus the clutch command, which is applied to one of the input of switch 306 of FIG. 13.

As described above, switch 306 outputs either a clutch command or a desired to RPM depending on whether the vehicle is in a launch condition. The output from switch 306 is input to select engagement command block 332. Select engagement command block 332 also receives as input the engagement point and the output from determine when to close clutch fully block 334.

FIG. 16 depicts an expanded block diagram of generate slip command ramp block 318 of FIG. 15. Generate slip command ramp block 318 receives as input the slip, the desired clutch command, and the desired slip rate, which is based on the engine RPM and throttle position. The desired clutch command and slip are input to a switch 340 which selects for output one of the slip value which is stored in memory 342 or the present slip value. The output of switch 340 depends upon the desired clutch command. If the desired clutch command is a logical true, switch 340 outputs the prior slip value. On the other hand, if the desired clutch command is a logical false, switch 340 outputs the present slip value. Switch 340 and memory 342 operate to effectively store the slip value input to generate slip command ramp block 318 at the start of engagement.

The desired slip rate is input to an amplifier 344 and is amplified by a value tloop. The output from amplifier from 344 is input to summer 346 and is subtracted from the prior desired slip rate which is stored in memory 348. The input to memory 348 is obtained through switch 350 which selects for output one of the value output from summer 346 and zero in depending upon the desired clutch command. If the desired clutch command is a logical true switch 350 outputs to the value from summer 346 to memory 348. If the desired clutch command is a logical false, switch 350 outputs zero to memory 348. In this manner, summer 346, memory 348, and switch 350 define a ramp for the slip which starts at zero at the beginning of clutch engagement and declines at a predetermine rate in accordance with the amplified value of the desired slip rate.

The output from switches 340 and 350 are input to summer 352 which adds the initial slip rate output from switch 340 and the ramp value output by switch 350. The output from summer 352 is input to switch 354 which outputs the summation value from summer 352 if the desired clutch command is a logical true. If the desired clutch command is a logical false, switch 354 outputs a value of zero. The output from switch 354 is then input to limiter 356 which places an upper and lower limit on the slip command if the slip command is above or below a predetermined value respectively. From limiter 356, generate slip command ramp block 318 outputs the slip command, to summer 320 as shown in FIG. 15.

Returning to FIG. 13, another input to select engagement command block 332 is the output from determine when to close clutch fully block 334. An expanded block diagram of determine when to close clutch fully block 334 is shown at FIG. 17. The input to this block includes the slip and the slip threshold. These inputs are applied to comparator 336 which outputs a logical true if the slip is less than the slip threshold, indicating that the clutch is ready to be fully engaged, or outputs a false if the slip is greater than the slip threshold, indicating that the clutch is not ready to be fully closed.

Returning once again to FIG. 13, the select engagement command block 332 receives as input the output from switch 306, the output from start engagement trigger 284, the output from determine when to close clutch fully block 334, and the engagement point. Based on these inputs, the select engagement command block 332 generates a clutch command in accordance with these inputs. Once it is determined that the clutch is ready to be fully engaged, select engagement command block 332 outputs the fully engaged position as the desired clutch position or clutch command and generates a finish engagement flag or signal which indicates that the engagement process is complete.

From the forgoing, it can be seen that the present invention provides a novel method and apparatus for automatically controlling a manual-style transmission. We are receiving a number of electronically generated inputs, the apparatus of the present invention determines various operating parameters for the transmission and generates control signals to control electronic actuators to effect the actual shift and clutch operation.

What is claimed is:

1. A hybrid transmission system for a vehicle having an engine, a drive wheel, a drive shaft connected to the drive wheel for rotating the drive wheel, comprising:

a manual transmission having an input shaft and an output shaft, the input shaft being driven and driving the output shaft, the output shaft being adapted to cause motion of the drive wheel through the drive shaft, the input and output shafts having a plurality of gears which selectively mesh for engagement to vary a relative speed of rotation between the input shaft and the output shaft;

a plurality of shift motors to effect engagement and disengagement of the gears;

a clutch for selectively coupling the engine to the transmission;

a clutch motor for engaging and disengaging the clutch;

an electric machine connected to the input shaft for selectively increasing and decreasing the speed of the input shaft; and a transmission controller which receives a plurality of input signals and generates a plurality of output signals, the output signals controlling the motors in order to effect changing gears of the transmission;

wherein the transmission operates in one of a plurality of modes, and the transmission controller selects between one of the plurality of modes in accordance with a hierarchy established to prioritize selection of the modes and wherein each of the plurality of modes is assigned a value that defines the mode, and the values define the hierarchy for prioritizing the modes, wherein either higher values take priority over lower values or lower values take priority over higher values.

2. The apparatus of claim 1 wherein the transmission operates in one of eight modes comprising a coast mode, a downshift mode, an upshift mode, a kickdown mode, a drive mode, a regenerative braking mode, an idle drive mode, a reverse mode, and a park neutral mode.

3. The apparatus of claim 2 wherein the modes are assigned values 0, 1, 2, 3, 4, 5, 6, 7, corresponding to the coast mode, the downshift mode, the upshift mode, the kickdown mode, the drive mode, the regenerative braking mode, the idle drive mode, the reverse mode, and the park neutral mode, respectively.

4. The apparatus of claim 3 wherein the modes having higher values have priority over modes having lower values.

5. The apparatus of claim 1 wherein the transmission controller defines a default mode of operation.

6. The apparatus of claim 1 wherein the electric machine varies the speed of the input shaft so that the relative speeds of the input shaft and output shaft enables synchronization of the gears.

7. The apparatus of claim 1 wherein the transmission controller further comprises a logic controller for determining the output signals, wherein the logic controller includes a mode select controller which tests for each respective mode and outputs a mode in accordance with the hierarchy.

8. The apparatus of claim 1 wherein the transmission controller includes a plurality of sections for controlling particular aspects of the transmission, comprising:

gear logic for determining a desired gear for operating the transmission;

torque reduction logic to vary a torque output by the engine;

shifter position logic for controlling the shift motors;

motor control logic to control the direction and output of the electric machine;

mode selection logic for testing for each respective mode and selecting a mode for output in accordance with the hierarchy;

shift state logic for controlling a sequence of events for operating the transmission; and clutch command logic for positioning the clutch to effect smooth operation of the transmission.

9. A hybrid transmission system for a vehicle, the vehicle having an engine, a drive wheel, a drive shaft connected to the drive wheel for rotating the drive wheel, comprising:

a manual transmission having an input shaft and an output shaft, the input shaft being driven and driving the output shaft, the output shaft being adapted to cause of the drive wheel through the drive shaft, the input and output shafts having a plurality of gears which selectively mesh for engagement to vary a relative speed of rotation between the input shaft and the output shaft;

a plurality of shift motors to effect engagement and disengagement of the gears;

a clutch for selectively coupling the engine to the transmission;

a clutch motor for engaging and disengaging the clutch;

an electric machine connected to the input shaft for selectively increasing and decreasing the speed of the input shaft, the electric machine varying the speed of the input shaft so that the relative speed between the input shaft and output shaft enables synchronization of the gears; and a transmission controller which receives a plurality of input signals and generates a plurality of output signals, the output signals controlling the motors in order to effect changing gears of the transmission;

wherein the transmission operates in one of a plurality of modes, and the transmission controller includes mode select logic for selecting between one of the plurality of modes in accordance with a hierarchy established to prioritize selection of the modes and each of the plurality of modes is assigned a value, and the values define the hierarchy for prioritizing the modes, wherein either higher values take priority over lower values or lower values take priority over higher values.

10. The apparatus of claim 9 wherein the transmission operates in one of eight modes comprising a coast mode, a downshift mode, an upshift mode, a kickdown mode, a drive mode, a regenerative braking mode, an idle drive mode, a reverse mode, and a park neutral mode.

11. The apparatus of claim 10 wherein the modes are assigned values 0, 1, 2, 3, 4, 5, 6, 7, corresponding to the coast mode, the downshift mode, the upshift mode, the kickdown mode, the drive mode, the regenerative braking mode, the idle drive mode, the reverse mode, and the park neutral mode, respectively.

12. The apparatus of claim 11 wherein the modes having higher values have priority over modes having lower values.

13. The apparatus of claim 12 wherein the logic controller defines a default mode of operation.

14. The apparatus of claim 13 wherein the logic controller tests for each respective mode and outputs a mode in accordance with the hierarchy.

15. The apparatus of claim 14 wherein the transmission controller includes a plurality of sections for controlling particular aspects of the transmission, comprising:

gear logic for determining a desired gear for operating the transmission;

torque reduction logic to vary a torque output by the engine;

shifter position logic for controlling the shift motors;

motor control logic to control the direction and output of the electric machine;

mode selection logic for testing for each respective mode and selecting a mode for output in accordance with the hierarchy;

shift state logic for controlling sequence of events for operating the transmission; and clutch command logic for positioning the clutch to effect smooth operation of the transmission.

* * * * *